(12) United States Patent
Cho

(10) Patent No.: US 6,988,408 B2
(45) Date of Patent: *Jan. 24, 2006

(54) SURFACE/BULK MICROMACHINED SINGLE-CRYSTALLINE SILICON MICRO-GYROSCOPE

(76) Inventor: Dong-il Cho, Da-1004, Samho Apartment, Bangbae-Dong, Socho-Ku, Seoul, 137-060 (KR)

(*) Notice: Subject to any disclaimer, the term of this patent is extended or adjusted under 35 U.S.C. 154(b) by 13 days.

This patent is subject to a terminal disclaimer.

(21) Appl. No.: 10/739,262

(22) Filed: Dec. 18, 2003

(65) Prior Publication Data

US 2004/0177689 A1 Sep. 16, 2004

Related U.S. Application Data

(63) Continuation-in-part of application No. 09/903,280, filed on Jul. 11, 2001, now abandoned.

(30) Foreign Application Priority Data

Jul. 13, 2000 (KR) ............................... 2000-40121

(51) Int. Cl.
*G01P 9/04* (2006.01)
(52) U.S. Cl. ............................. 73/504.14; 73/504.12
(58) Field of Classification Search ............ 73/504.12, 73/504.14, 504.15, 504.16; 438/50
See application file for complete search history.

(56) References Cited

U.S. PATENT DOCUMENTS

| 5,198,390 A | | 3/1993 | MacDonald et al. ......... 437/203 |
|---|---|---|---|
| 5,563,343 A | * | 10/1996 | Shaw et al. .............. 73/514.18 |
| 5,616,514 A | | 4/1997 | Muchow et al. ............... 438/50 |
| 5,930,595 A | | 7/1999 | Sridhar et al. ................ 438/52 |
| 5,945,599 A | | 8/1999 | Fujiyoshi et al. ......... 73/504.12 |
| 6,055,858 A | | 5/2000 | Muenzel et al. .......... 73/504.12 |
| 6,240,780 B1 | * | 6/2001 | Negoro et al. ........... 73/504.12 |
| 6,569,702 B2 | * | 5/2003 | Cho et al. ..................... 438/50 |

FOREIGN PATENT DOCUMENTS

KR 1999-79113 11/1999

OTHER PUBLICATIONS

Silicon Monolithic Micromechanical Gyroscope, P. Greiff et al. The Charles Stark Draper Laboratory, Cambridge, Mass. 1991.
Surface Micromachined Z-Axis Vibratory Rate Gyroscope, Clark et al, Berkeley, Calif. Jun. 1996.
SCREAM I: A Single Mask, Single-Crystal Silicon, Reactive Ion Etching Process For Microelectromechanical Structures, Shaw et al., Sensors and Actuators, 1994, pp. 63-70.
SOI (SIMOX) As A Substrate For Surface Micromachining Of Single Crystalline Silicon Sencors and Actuators; Diem et al; Jun. 1993, pp. 233-236.

(Continued)

*Primary Examiner*—John E. Chapman
(74) *Attorney, Agent, or Firm*—Head, Johnson & Kachigian

(57) ABSTRACT

A micromachined single-crystalline silicon micro-gyroscope comprising oxide/polysilicon/metal triple layer for electrical isolation is disclosed. The isolation method includes forming the triple layer composed of an insulation layer formed over an exposed surface of the silicon microstructure, a conductive layer formed over the entire insulation layer, and a metal layer formed over a top portion of the microstructure; and etching the conductive layer at the bottom to form electrical isolation between parts of the microstructure. The method does not require a separate photolithography process for isolation, and can be effectively applied to microstructures having high aspect ratios and narrow trenches.

11 Claims, 25 Drawing Sheets

OTHER PUBLICATIONS

A New Silicon Rate Gyroscope, Geiger et al, Hahn-Schickard-Gesellschaft, Institute of Micromachining and Information Technology, Feb. 1998, pp. 615-620.

Lateral Gyroscope Suspended By Two Gimbals Through High Aspect Ratio ICP Etching; Park et al, Opto-Mechatronics Research, R&D Center, Suwon, Korea, Jun. 1999, pp. 972-975.

A Symmetrical Z-Axis Gyroscope With A High Aspect Ratio Using Simple and New Process; Back et al; Micro Systems, Lab, Samsung Advanced Institute of Technology, Suwon, Korea, Jan. 1999.

A New Micromachining Technique With (111) Silicon; Lee et al; Jpn. J. Appl. Phys., May 1999, pp 2699-2703.

Mesa-Supported, Single-Crystal Microstructures Fabricated By The Surface/Bulk Micromachining Process; Park et al; Jpn. J. Appl. Phys. Jul. 1999, pp. 4244-4249.

The Surface/Bulk Micromachining (SBM) Process: A New Method For Fabricating Released MEMS In Single Crystal Silicon; Lee et al; J. Microelectromech. Sys. Dec. 1999, pp 409-416.

Surface/Bulk Micromachining (SBM) Process and Deep Trench Oxide Isolation Method For MEMS; Lee et al; School of Electrical Engineering, College of Engineering, Seoul National University, Seoul, Korea Dec. 1999 pp. 701-704.

Vertical Mirrors Fabricated By Deep Reactive Ion Etching For Fiber-Optic Switching Applications; Marxer et al; J. Microelectromech. Sys. Sep. 1997 pp 277-285.

Trench Oxide Isolated Single Crystal Silicon Micrormachined Accelerometer; Sridhar et al; Institute of Microelectronics, Singapore; Dec 1998 pp. 475-478.

* cited by examiner (Y-axis corresponds to the root mean square voltage in Log-scale.)

SURFACE/BULK MICROMACHINED SINGLE-CRYSTALLINE SILICON MICRO-GYROSCOPE

This application is a continuation-in-part of Ser. No. 09/903,280 filed on Jul. 7, 2001 now abandoned.

BACKGROUND OF THE INVENTION

1. Field of the Invention

The present invention relates to a micro-gyroscope. In particular, the present invention relates to a surface/bulk micromachined single-crystalline silicon micro-gyroscope.

2. Description of the Related Art

Microelectromechanical systems include component structures with typical minimum dimensions on the order of a micron where the component structures can have elaborate shapes and perform a variety of complex functions. The component structures of microelectromechanical systems are formed on a semiconductor, glass or quartz substrate. Microelectromechanical systems include devices such as accelerometers that sense the acceleration of a moving object, gyroscopes that sense the angular rate of a rotating object and mirror arrays that deflect light in fiber optic communication and display applications. Micromachining techniques are used to fabricate the very small structures that are integrated with electrical parts on the semiconductor or glass substrate. The techniques used to fabricate these microelectromechanical systems are largely based on semiconductor device fabricating technology, including photolithography, thin film deposition, etching, impurity doping by diffusion and ion implantation, electroplating and wafer bonding.

Micro-gyroscopes for measuring the rate and/or angle of rotation have received much attention. Application areas include navigation systems, automotive safety and stability control systems, video camera stabilization, and 3-D input devices for computers and personal digital assistance (PDA) systems.

Gyroscope measures the rate and/or angle of rotation by a Coriolis force generated at a vibrating part wherein the angular rate is applied. Structure of a gyroscope basically has a mass for driving and a mass for sensing the motion generated by the Coriolis force, which are respectively supported by springs. These springs should be aligned with each other at a 90° angle. A micro-gyroscope includes electrodes that are electrically isolated to allow, for example, to measure electrical signals flowing in the sensing part of the system. Other example of electrodes are used to apply electrical signals to the vibrating parts of the system. Gyroscopes wherein the mass for the driving and the mass for sensing are separated are called "decoupled" gyroscope. The mass for driving and the mass for sensing are connected by a sensing spring. In the decoupled gyroscope, the mass, driving electrodes, sensing electrodes, and driving sensing electrodes should be isolated from each other. It is well known that the resolution of a coupled gyroscope is relatively lower than that of a decoupled gyroscope, because of the cross-axis mode coupling.

Firstly, conventional various micro-gyroscopes are explained as follows.

Researchers at the Charles Stark Draper Laboratory demonstrated one of the first silicon gyroscopes in 1991, using the p++ etch stop technique, and a resolution of 4°/sec was achieved with a 1 Hz bandwidth as discussed in P. Greiff, B. Boxenhom, T. King, and L. Niles, "Silicon monolithic micromechanical gyroscope," in *Tech. Dig. 6th Int. Conf. Solid-State Sensors and Actuators (Transducers '91)*, San Francisco, Calif., June 1991, pp. 966–968.

In 1996, researchers at Berkeley reported a surface micromachined polysilicon gyroscope integrated with a transresistance amplifier on a single die as discussed in W. A. Clark, R. T. Howe, and R. Horowitz, "Surface micromachined z-axis vibratory rate gyroscope," in *Tech. Dig. Solid-State Sensor & Actuator Workshop*, Hilton Head Island, S.C., June 1996, pp. 299–302. This device was fabricated by the Analog Devices BiMEMS process, and showed a resolution of 1°/sec with a 1 Hz bandwidth.

To achieve an improved resolution, increasing the thickness of structures and using single-crystalline silicon as a structural material have been an active research topic in more recent years. High-aspect-ratio structures (HARS) provide a large lateral capacitance, which in turn, allows realizing high-sensitivity sensors or high-force actuators. Furthermore, a reduced cross-axis coupling is possible with HARS. Since the availability of deep silicon etchers, many process techniques for fabricating HARS have been developed as discussed in K. A. Shaw, Z. L. Zhang, and N. C. MacDonald, "SCREAM I: a single mask, single-crystal silicon, reactive ion etching process for microelectromechanical structures," *Sensors and Actuators A*, vol. 40, pp. 63–70, 1994.

Other HARS fabrication methods are discussed in J. Muchow, H. Muenzel, M. Offenberg, W. Waldvogel, "Method of fabricating a micromechanical sensor," U.S. Pat. No. 5, 616, 514, April 1997 and B. Diem, M. T. Delaye, F. Michel, S. Renard, and G. Delapoerre, "SOI(SIMOX) as a substrate for surface micromachining of single crystalline silicon sensors and actuators," in *Tech. Dig. 7th Int. Conf. Solid-State Sensors and Actuators(Transducers'93)*, Yokohama, Japan, June 1993, pp. 233–236.

In 1997, researchers at HSG-IMIT reported a 10 micrometer-thick, x-axis gyroscope using epitaxially-grown polysilicon as a structural material as discussed in W. Geiger, B. Folkmer, J. Merz, H. Sandmaier, and W. Lang, "A new silicon rate gyroscope," in *Proc. IEEE Workshop on Microelectromech. Syst.* (MEMS'98), Heidelberg, Germany, February 1998, pp. 615–620. The device showed a 0.096°/sec resolution with a 50 Hz bandwidth.

Researchers at Samsung also reported a gyroscope using the SOI(Silicon on Insulator) process which showed a resolution of 0.015°/sec with a 25 Hz bandwidth as discussed in K. Y. Park, H. S. Jeong, S. An, S. H. Shin, and C. W. Lee, "Lateral gyroscope suspended by two gimbals through high aspect ratio ICP etching," in *Tech. Dig. 10th Int. Conf. Solid-State Sensors and Actuators (Transducers'99)*, Sendai, Japan, June 1999, pp. 972–975 and an other gyroscope using an anodically bonded wafer which showed a resolution of 0.01°/sec at a 5 Hz angular-rate input as discussed in S. S. Baek, Y. S. Oh, B. J. Ha, S. D. An, B. H. An, H. Song, and C. M. Song, "A symmetrical z-axis gyroscope with a high aspect ratio using simple and new process," in *Proc. IEEE Workshop on Microelectromech. Syst. (MEMS'99)*, Orlando, Fla., January 1999, pp. 612–617.

The epi-poly process utilizes a polycrystalline-phase film for the structural material, and similar to the LPCVD polysilicon films, it can have problems of residual stress or stress gradient. In the SOI process, the structural material is single-crystalline silicon, but the high cost of wafers and the residual stress resulting from the bonding process are the main disadvantages. Furthermore, the sacrificial gap thickness is limited by the buried oxide layer thickness. Another major drawback of the SOI and epi-poly processes is the footing effect. An uncontrollable undercutting phenomenon occurs at the boundary between silicon and oxide layer in deep RIE processes. The footing effect can significantly alter the stiffness properties and reduce reproducibility.

As a new alternative of silicon HARS micromachining techniques, D. Cho et al. have developed the single-wafer Surface/Bulk Micromachining (SBM) technology as discussed in S. Lee, S. Park, and D. Cho, "A new micromachining technique with (111) silicon," *Japanese Journal of Applied Physics*, vol. 38, pp. 2699–2703, May 1999; S. Park, S. Lee, S. Yi, and D. Cho, "Mesa-supported, single-crystal microstructures fabricated by the surface/bulk micromachining (SBM) process", *Japanese Journal of Applied Physics*, vol. 38, pp. 4244–4249, July 1999. S. Lee, S. Park, and D. Cho; "The surface/bulk micromachining (SBM) process: a new method for fabricating released microelectromechanical systems in single crystal silicon," *IEEE/ASME J Microelctromech. Syst.*, vol. 8, no. 4, pp. 409–416, December 1999; S. Lee, S. Park, and D. Cho, "Surface/bulk micromachining (SBM) process and deep trench oxide isolation method for MEMS," in *Tech. Dig. IEEE Electron Devices Meeting (IEDM'99)*, Washington, D.C., December 1999, pp. 701–704; and D. Cho, S. Lee, S. Park, "Micromachanical System Fabrication Method Using (111) Single Crystalline Silicon," U.S. Pat. No. 6,150,275, November 2000. The SBM technology can fabricate released structures of single-crystalline silicon without using the intermediate oxide layer or wafer bonding. In addition, the footing phenomenon does not occur in this process.

Secondly, conventional isolation methods used in a micromechanical system are as follows.

FIG. 1 shows process steps in the conventional isolation process known as the single crystalline reactive etching and metallization (SCREAM) process. The SCREAM isolation process is performed on a structure fabricated by the SCREAM micromachining technique in the manner discussed in U.S. Pat. No. 5,563,343; U.S. Pat. No. 5,198,390; and K. A. Shaw, Z. L. Zhang, and N. C. MacDonald, "SCREAM I: A Single Mask, Single-Crystal Silicon, Reactive Ion Etching Process for Microelectromechanical Structures," *Sensors and Actuators A*, Vol. 40, pp. 63, 1994. Plasma enhanced chemical vapor deposition (PECVD) covers all surfaces of a micromachined structure with an oxide film. Selective deposition of metal film on the structure forms electrodes and electrically conducting paths on top of the PECVD oxide film so that the PECVD oxide film separates the electrodes from the silicon substrate. In this SCREAM process, electrical isolation of the electrodes is achieved by depositing the metal film only on the top and the side surfaces of microelectromechanical structures that are covered by the PECVD oxide film.

The SCREAM isolation process has the advantage of being relatively simple in not requiring separate photolithography and etching steps once the structure is fabricated using the SCREAM micromachining technique. On the other hand, the coverage achieved in the deposition of the metal film is generally poor and hence the SCREAM isolation process typically cannot be applied to tall structures having a high aspect ratio. It should be noted that, if a material is deposited that has good step coverage, by low pressure chemical vapor deposition (LPCVD), all electrodes and microelectro-mechanical parts are electrically connected, and hence, electrical isolation is not achieved.

FIG. 2 shows the silicon on oxide insulator (SOI) wafer method, used in forming the microelectromechanical systems described in the following references: B. Diem, et al., "SOI(SIMOX) as a Substrate for Surface Micromachining of Single Crystalline Silicon Sensors and Actuators," *Tech. Dig. 7th Int. Conf. Solid-State Sensors and Actuators (Transducers '93)*, Yokohama, Japan, 1993, pp. 233–236; and C. Marxer, et al., "Vertical Mirrors Fabricated by Deep Reactive Ion Etching for Fiber-Optic Switching Applications," *IEEE/ASME Journal of Microelectromechanical Systems*, Vol. 6, No. 3, pp. Sept. 1997. In the SOI wafer method, the portion of the wafer on top of the buried oxide layer (device layer) is highly doped, conducting silicon. Since all structures and electrodes are fabricated in the device layer and are defined by etching the device layer down to the buried oxide layer, electrical isolation of the resulting electrodes is achieved automatically. On the other hand, SOI wafers are generally expensive and the residual stress created by the buried oxide layer can warp and change the shape of microelectromechanical structures made on the device layer. In addition, the micromachined portions of the device layer silicon near the oxide interface can have roughened features (produced by the "footing" effect) when the structures and electrodes are formed in a deep plasma etching process. Another disadvantage of the SOI process is that the as-manufactured wafer has an established thickness of the oxide film and the device layer and these thicknesses cannot be modified once a wafer is manufactured.

FIG. 3 shows a scanning electron microscope (SEM) photograph of a micromachined comb-drive structure fabricated from single crystal silicon. The electrodes of the illustrated comb-drive structure are isolated using the junction isolation method. The junction isolation method is described, for example, in S. Lee, S. Park and D. Cho, "The Surface/Bulk Micromachining (SBM) Process: A New Method for Fabricating Released Microelectromechanical Systems in Single Crystal Silicon," *IEEE/ASME J Microelectromechanical Systems*, Vol. 8, No. 4, December 1999. The junction isolation method forms a junction diode on a lightly doped N-type or P-type wafer. Applying a reverse biased voltage to the junction diode isolates the junction electrode from the substrate. Referring to FIG. 3, the silicon substrate is lightly doped P-type and the lighter parts, including the comb-drive structure, are highly doped N-type with phosphorus, so that a PN junction between the silicon substrate (P-type) and the electrode (N-type) is formed. In this case, if a reverse bias voltage is applied to the PN junction, the electrodes are electrically isolated from the silicon substrate. This method has the advantage that the isolation steps are done before the micromechanical structure is fabricated, so that the structure can be fabricated in a relatively easy manner and with relatively little of the stress created by the isolation method. On the other hand, the method has disadvantage that the depth of the PN junction often cannot be made sufficiently deep, so that this process usually is not readily applied to a tall structure having a high aspect ratio.

FIG. 4 is a structure formed by yet another conventional isolation method, the trench oxide isolation method, described in the following references: U.S. Pat. No. 5,930, 595; U. Sridhar et al., "Trench Oxide Isolated Single Crystal Silicon Micromachined Accelerometer," *IEEE IEDM*, San Francisco Calif., Dec. 6–9, 1998. pp. 475–478; and S. Lee, S. Park, D. Cho and Y Oh "Surface/Bulk Micromachining (SBM) Process and Deep Trench Oxide Isolation Method for MEMS", *IEEE IEDM*, Washington, D.C., Dec. 5–8, 1999. pp. 701–704. This trench isolation method includes forming U-shaped trenches 104 on a silicon substrate 102, forming thermal oxide layers 106 and depositing oxide 108 on all sides of the structure where the trenches are formed (An unfilled tubular volume 109 may be defined towards the bottom of the trench). The oxide films 106, 108 filling the trenches attach the electrode structures 112 to the silicon substrate 102 through the respective sidewalls so that the oxide films support the electrodes and tethered structures. The oxide films electrically isolate the electrodes from each other and from the substrate.

An area of substrate material 110 is enclosed within each trench 104. These areas 110 are referred to as electrodes. These electrodes 110 are surrounded on three sides and on the bottom by the thermal oxide 106 and trench fill oxide 108 defined in the trenches 104. One side 111 of the islands is not covered by the insulating oxides 106, 108 of the trenches. The sensor beam 112 is connected to the islands at this uncovered side 111. This connection is the anchor portion of the beam.

This trench isolation method has the advantage that the method can be applied to a tall structure having a high aspect ratio. On the other hand, separate photolithography and etching steps are required to form a metal layer on the electrode to allow wire bonding the electrode to a package. Two different release processes are required: one to separate the electrode component from the substrate and a second to separate the structure part from the substrate. The trenches between the sidewalls of the electrode and the sidewalls of the substrate generally cannot be made arbitrarily large, as would be desired to achieve a small parasitic capacitance, without sacrificing the structural rigidity of the trench filled oxide layers that support the structure and electrodes. Additionally, the conventional trench isolation method deposits the insulation layers on the sides of the electrode to support the structure and electrodes. Therefore, the electrode and the substrate need to be supported by means other than the insulating layers during manufacturing, which limits the electrode shapes that can be made. In particular, it is difficult to fabricate an electrode in an "island" shape or surrounded by a movable structure. Thus it is very difficult to arrange complicated electrodes like that used in a micro-gyroscope. Those skilled in the art can appreciate the need for a simpler isolation method.

FIG. 5 illustrates aspects of a surface/bulk micromachining technique, as described in co-pending U.S. patent application Ser. No. 09/756,981, filed Jan. 9, 2001 and entitled "Isolation Micromachined Single Crystal Using Deep Trench Insulation," which patent application is hereby incorporated by reference in its entirety. This application describes an alternate strategy for electrically isolating microstructures. It should be noted that the present triple layer isolation can be used in conjunction with the isolation strategy described in the above-referenced surface/bulk micromachining application.

FIG. 5 shows an isolation process employing a deep trench insulation layer. First, a trench deeper than the thickness of the electrode to be formed is etched at an intermediate position of the electrode to be formed on a single crystalline silicon substrate. The trench is filled with an insulation material such as silicon oxide. As shown in FIG. 5, the oxide or other insulation is stripped from the top surface of the silicon. The process then forms a mask on the top surface of the silicon establishing the lateral extents of the electrodes to be formed. The structures and electrodes are patterned and etched to the designated depth. The sidewalls of the electrode are passivated and then the trenches are etched deeper to expose sidewalls beneath the electrodes. Lateral release etching is conducted to form the electrode structures. The moving structure and the electrode portion 51 are then released and separated from the silicon substrate. Finally, metal is sputtered over the electrodes to make them more conductive so that contacts can readily be formed.

The insulation layer 52 filled in the deep trench is fixed in the silicon substrate and supports the electrode portion from the interior of the electrode. According to the process illustrated in FIG. 5, the insulation material filled in the deep trench is fixed to the silicon substrate and passes through the interior of the electrode to support the electrode. Consequently, an insulation layer is not necessary on the side of the electrode. Therefore, electrodes having an "island" shape and separated from the silicon substrate on all sides can be formed. This process has the advantage that the metal layer is vapor-deposited on the electrode structure and the electrode structure is formed in a single release process. The metal layer can be formed without separate photolithography and etching processes. The process illustrated in FIG. 5, however, cannot provide sufficient supporting strength for the conventional packaging or wire bonding process.

Finally, U.S. Pat. No. 6,055,858 illustrates another prior approach. A web 9 is not a spring but a simple metal line for transmission. Further expensive SOI (silicon on insulator) is utilized. There is a disadvantage of the residual process as set forth on page 5 above.

SUMMARY OF THE INVENTION

Accordingly, the present invention is directed to single-crystalline-silicon, single-wafer gyroscope fabricated using a new isolation method.

The new isolation method includes providing a microstructure comprising silicon, the microstructure having at least one released surface opposite and spaced from an underlying surface of a substrate comprising silicon. An insulation layer is formed over surfaces of the microstructure, including over the released surface, a conductive layer is formed over surfaces of the insulation layer, and a metal layer is formed over at least a top surface of the conductive layer on at least a portion of the microstructure.

Another preferred isolation method forms an insulation layer on the exposed surfaces of a microstructure after the microstructure has been formed by micromachining and released from the surface of an underlying substrate. The isolation method forms a conductive layer over the entire insulation layer and forms a metal layer over the conductive layer on top portions of the microstructure. Etching of the conductive layer at a portion of the bottom exposed to the top of the micro-gyroscope as the shape of the movable structure forms electrical isolation between parts of the microstructure.

The conductive layer preferably may be a heavily-doped polycrystalline silicon layer having good step coverage formed by low pressure chemical vapor deposition ("LPCVD"). Etching of the conductive layer preferably may be accomplished by anisotropic dry etching. The insulation layer preferably may be a thermal oxide layer formed on the surface of a preferred single crystalline silicon by thermal oxidation. Alternatively, the insulation layer may be an oxide layer or a nitride layer formed by plasma enhanced chemical vapor deposition ("PECVD") or LPCVD having good step coverage, or a composite insulation layer of a thermal oxide layer, an LPCVD oxide layer, an LPVCD nitride layer, a PECVD oxide layer and/or a PECVD nitride layer. Other insulators are apparent.

Another aspect of the invention provides a silicon microstructure having released structures and a layer structure for electrically isolating portions of the silicon microstructure.

The layer structure comprises an insulation layer formed over released surfaces of the silicon microstructure, a conductive layer formed over the insulation layer including over sidewalls of the released structures, conductive layer having gaps electrically isolating portions of the silicon microstructure, and a metal layer formed over portions of the released structures.

An aspect for the present invention provides a micro-gyroscope comprising of oxide/polysilicon/metal triple layer for electrical isolation, in which the polysilicon layer is etched at a portion of the bottom exposed to the top of the micro-gyroscope, as the shape of the movable structure in order to accomplish the electrical isolation in the microstructure of the micro-gyroscope. The thickness of the layers also serves to compensate for the undercutting phenomenon inherent in deep silicon reactive ice etching ("RIE"), which can alter the stiffness characteristics.

An aspect of the present invention provides a micro-gyroscope fabricated by an isolation method which dose not require a separate photolithography process for isolation, there for can be applied to microstructures having high aspect ratios and narrow trenches.

An aspect of the present invention provides a micromachined single-crystalline silicon micro-gyroscope, comprising: a reference electrode, driving electrodes, driving sensing electrodes, and sensing electrodes which are fixed structures, and an outer mass which is connected to the reference electrode via driving springs, and an inner mass which is connected to the outer mass via sensing springs, wherein the outer mass and the inner mass are movable structures, and are released and separated from the bottom surface of the micro-gyroscope by certain predetermined distance, and wherein the outer mass and the inner mass are vibrated in the driving direction when voltage is applied to the driving electrodes, and if the angular rate is applied to the micro-gyroscope, the inner mass is vibrated in the direction perpendicular to the driving direction of the outer mass, and the sensing electrodes located in the inner mass detect the vibration of the inner mass, and thus the micro-gyroscope senses the angular rate; and wherein an insulation layer and a conductive layer are deposited on the surface of the micro-gyroscope, a metal layer is further deposited on the top of the micro-gyroscope, and the conductive layer is etched away at the bottom among the reference electrode, driving electrodes, driving sensing electrodes, and sensing electrodes so as to these electrodes are isolated from each other.

In the gyroscope according to the present invention, the cavity(hereinafter, referred to as "the sacrificial gap") is formed between the movable structures and the bottom of the micro-gyroscope.

The term "step coverage" means the tendency of deposition coverage to the surface wherein the step is formed as shown in FIG. 6A. If a material which has a "good step coverage" is deposited on the surface shown in FIG. 6A, the lateral portion shall be deposited as shown in FIG. 6B. However, if a material which has a "poor step coverage" is deposited, the lateral portion is hardly deposited as shown in FIG. 6C.

BRIEF DESCRIPTION OF THE DRAWINGS

Aspects and various advantages of the present invention are described below, with reference to the various views of the drawings, which form a part of this disclosure.

DETAILED DESCRIPTION OF THE PREFERRED EMBODIMENT

In the Micro-gyroscope of the present invention, electrically isolation of the microstrustures is accomplished by oxide/polysilicon/metal triple layer deposited in the microstructure. In the triple layer, the polysilicon layer is etched for electrically isolation after formation of oxide/polysilicon/metal triple layer or formation of oxide/polisilicon double layer. In the latter case, metal layer is deposited after the polysilicon layer etching.

In the following embodiment, the isolation method uses a heavily-doped LPCVD polysilicon film as the polysilicon layer, which can deposited in all sidewalls with an good step coverage, even in narrow-gap trenched. And the polisilicon layer at a portion of the bottom exposed to the top of the micro-gyroscope is etched away as the shape of the movable structure after the formation of the triple layers.

Figure 1:
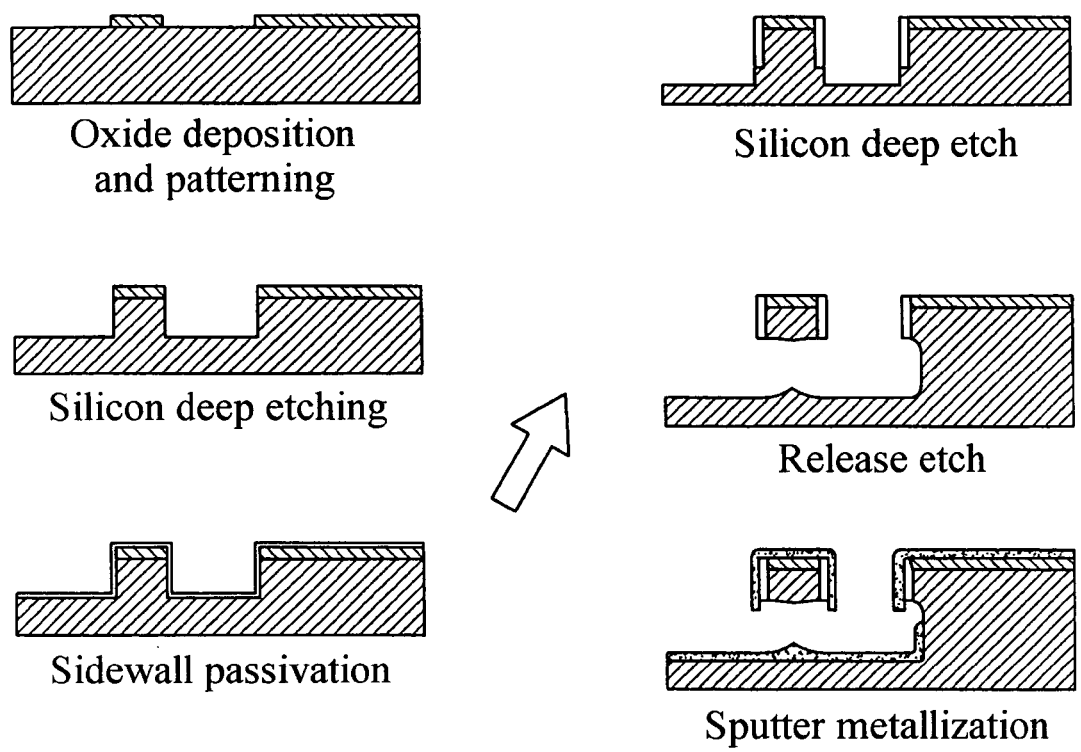
FIG. 1 illustrates a conventional SCREAM isolation process.
Figure 2:
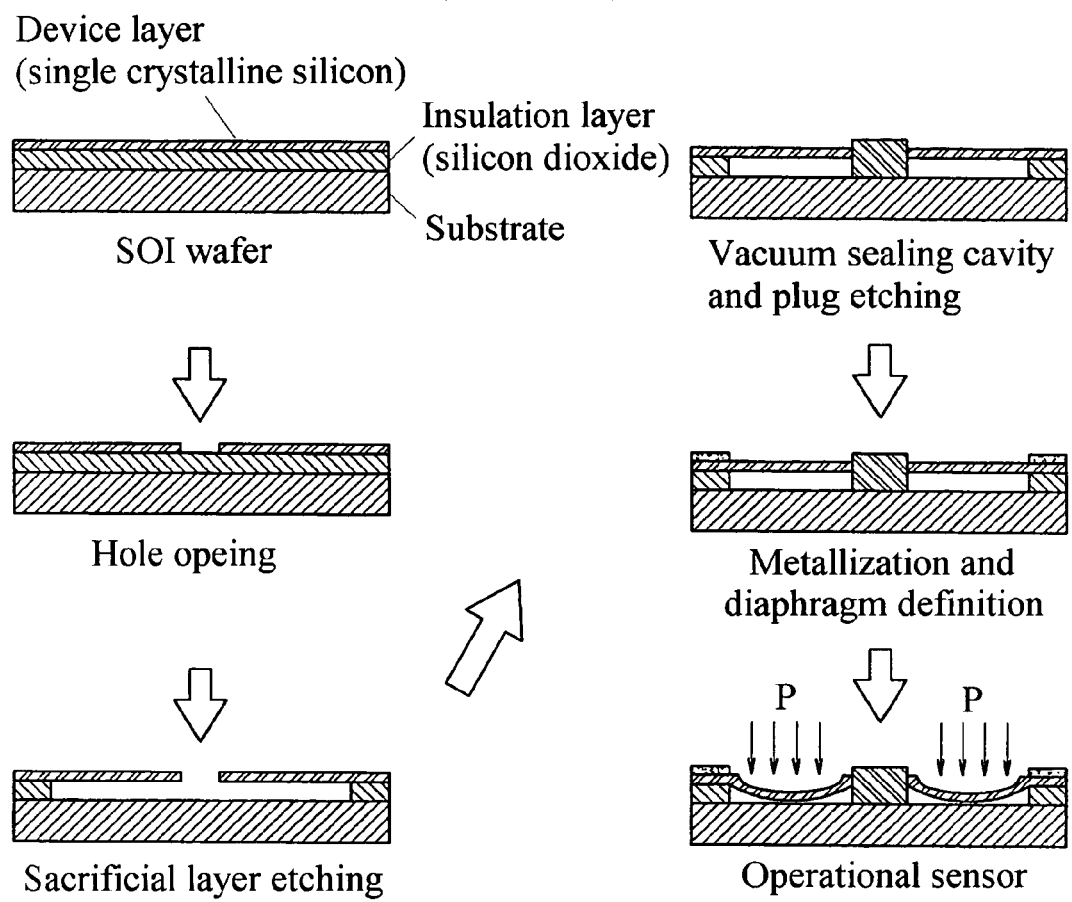
FIG. 2 illustrates a conventional isolation process employing a silicon on insulator ("SOI") wafer.
Figure 3:
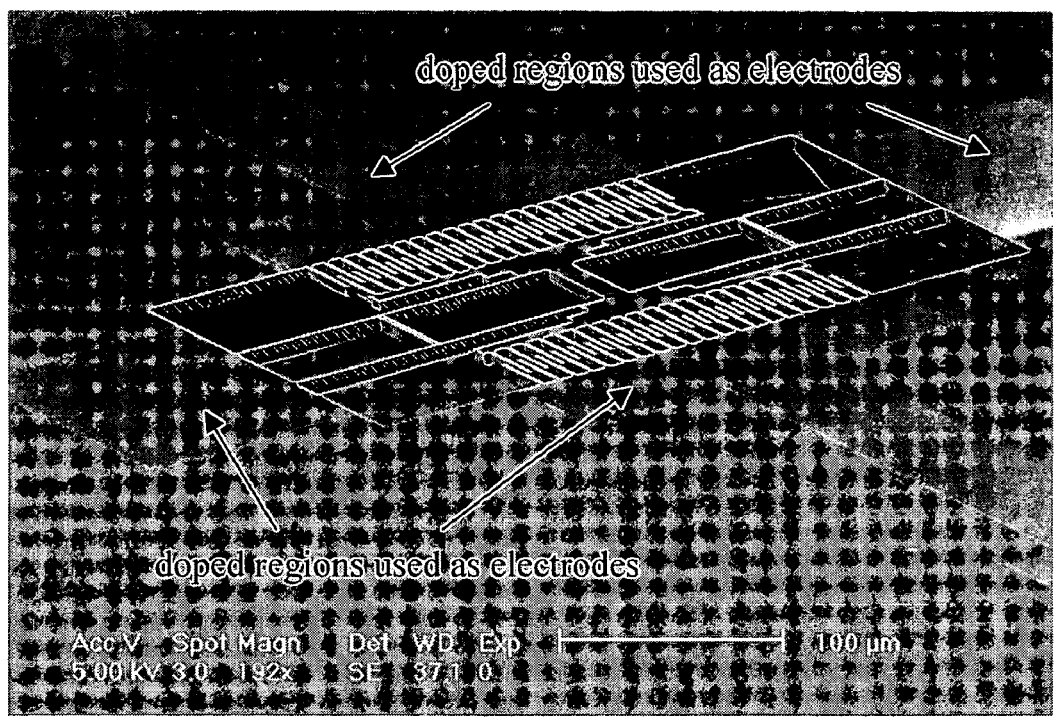
FIG. 3 shows scanning electron microscope ("SEM") photograph of a micromachined comb-drive structure employing a conventional junction isolation method.
Figure 4:
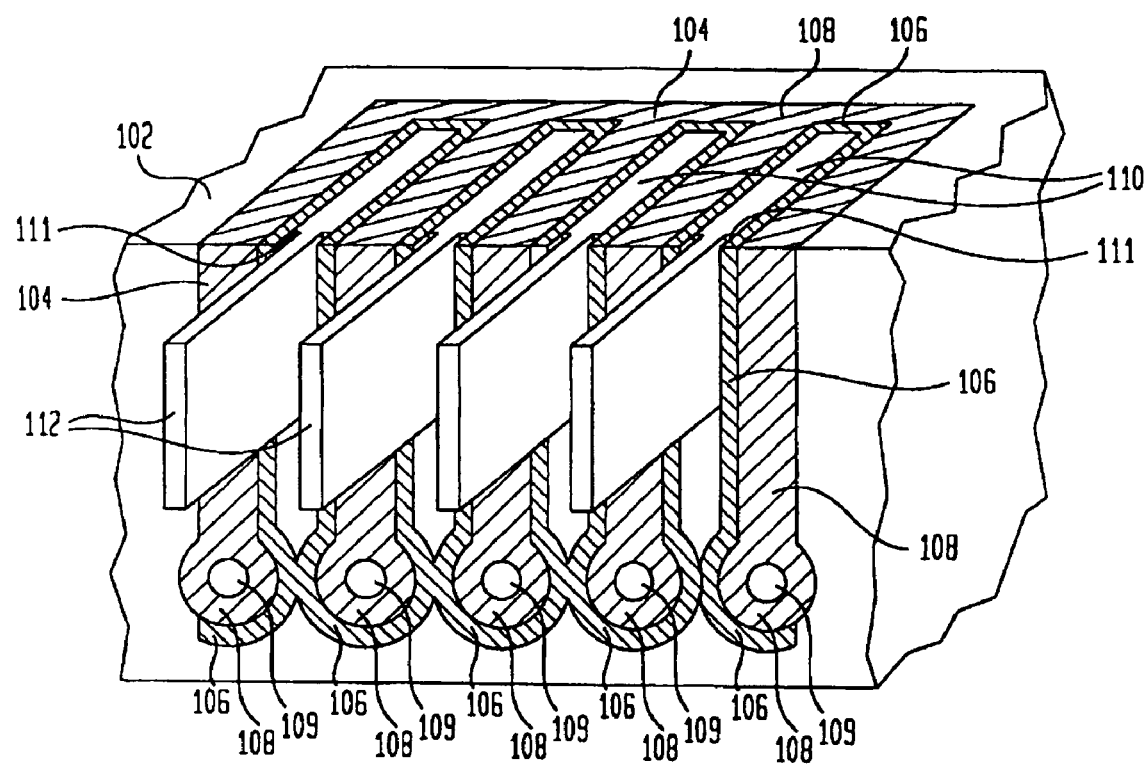
FIG. 4 illustrates a conventional trench oxide isolation method.
Figure 5:
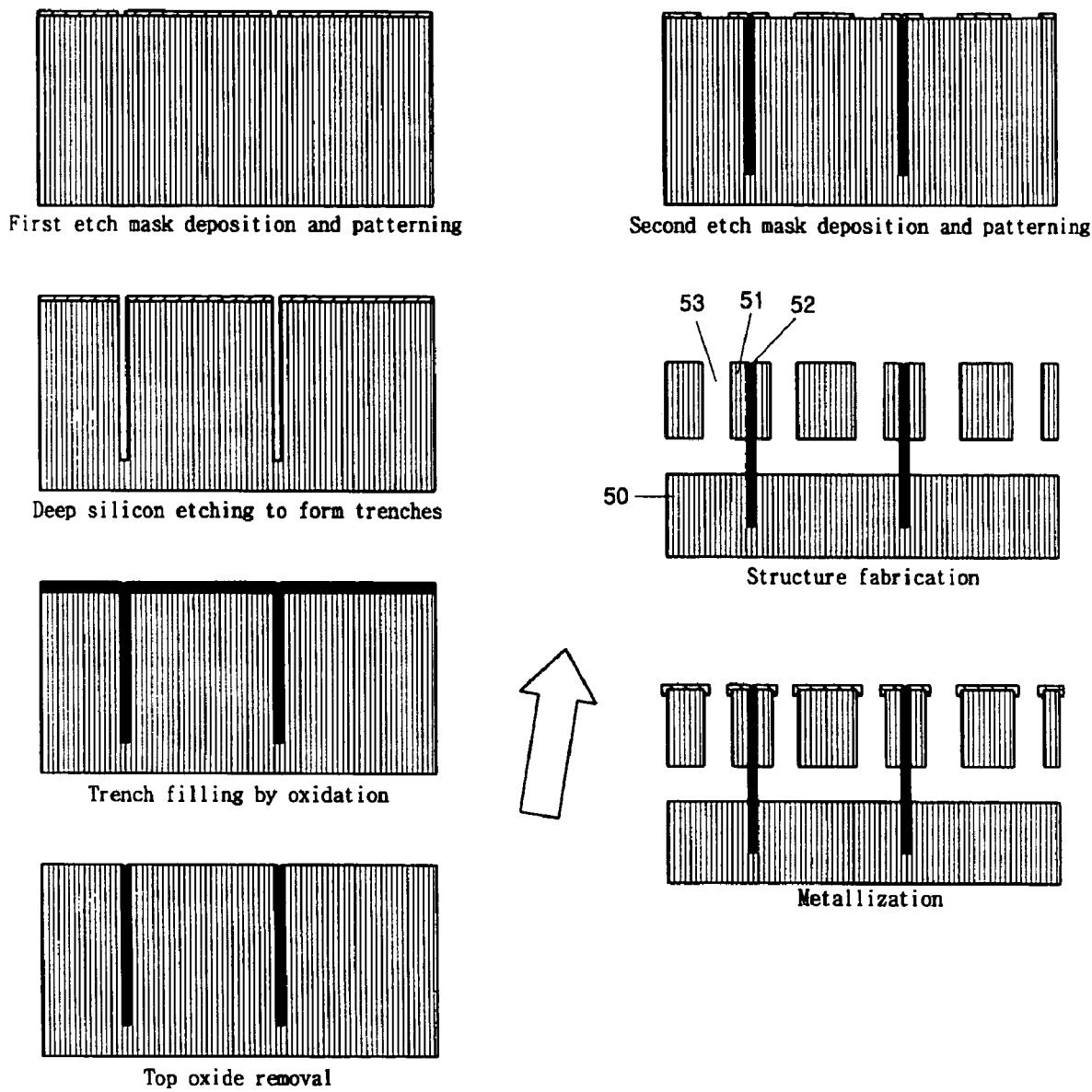
FIG. 5 illustrates an isolation process employing a deep trench insulation layer.
Figure 6A:
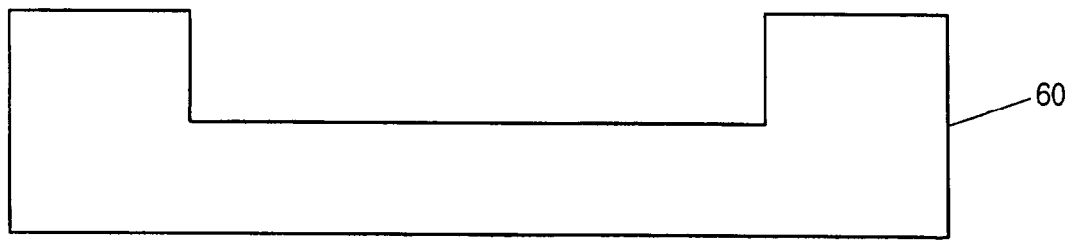
FIGS. 6A–6C illustrate the difference between the deposition of good step coverage material and the deposition of poor step coverage material.
Figure 6B:
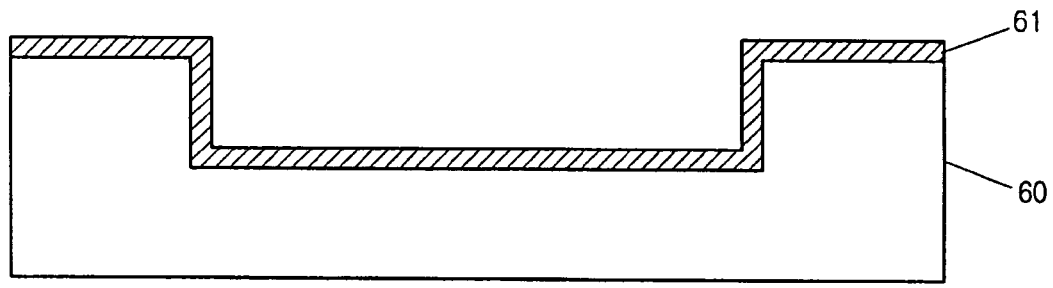
Figure 6C:
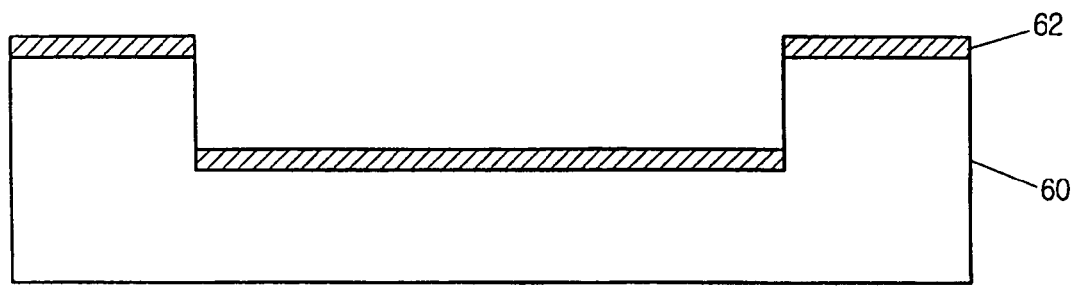
Figure 7:
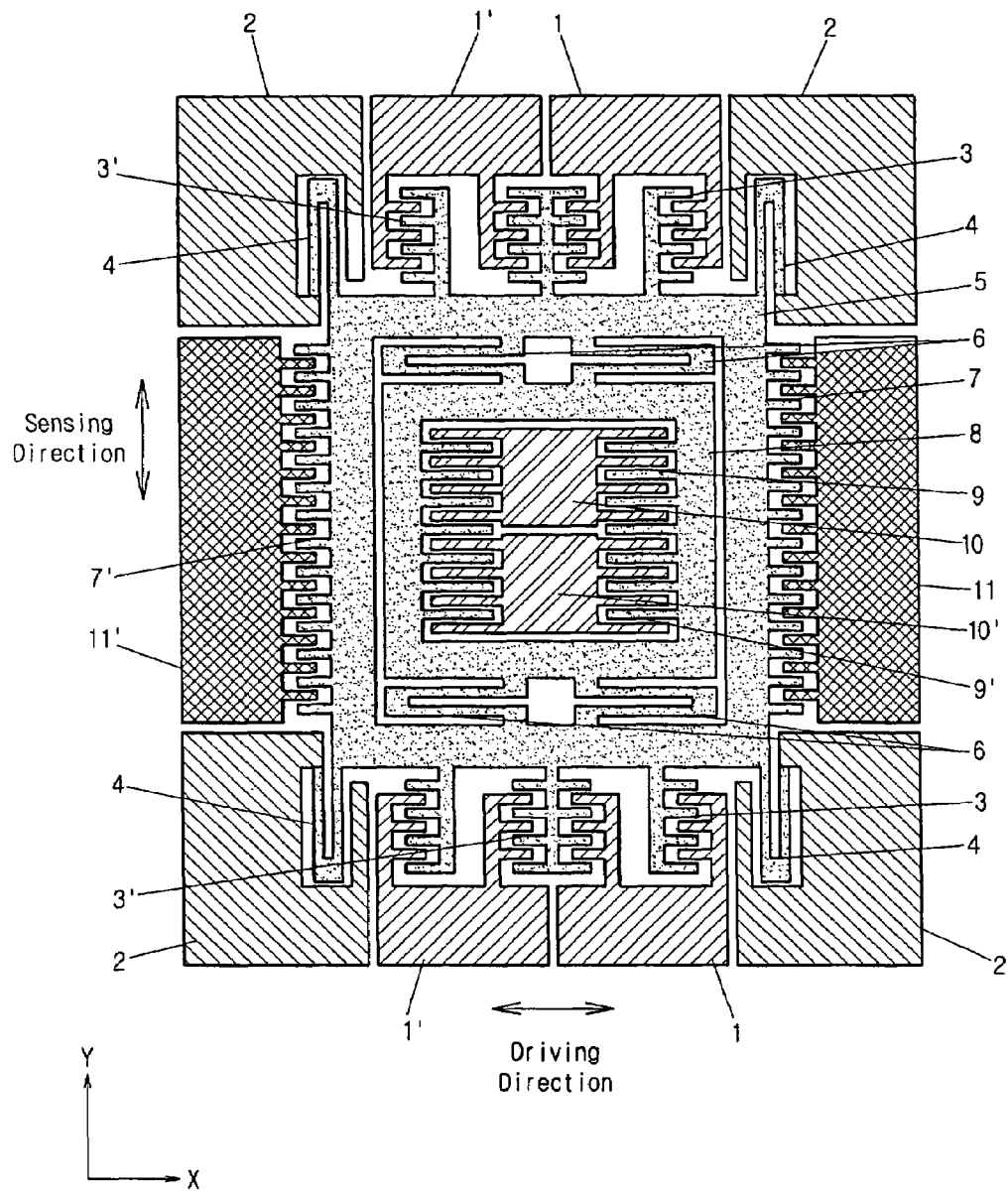
FIG. 7 is a schematic plane view of the micro-gyroscope according to the present invention.

FIG. 7 is a schematic plane view of the micro-gyroscope of the present invention. The micro-gyroscope comprises a reference electrode 2, driving electrodes 1, 1', driving sensing electrodes 11, 11', sensing electrodes 10, 10', an outer mass 5, and an inner mass 8.

The reference electrode 2, the driving electrodes 1, 1', the driving sensing electrodes 11, 11', and the sensing electrodes 10, 10' are fixed structures i.e., non-movable structures because these electrodes are formed on the substrate fixedly.

To the contrary, the outer mass 5, the inner mass 8, driving springs 4, and sensing springs 6 are movable structures. The outer mass 5 is connected to the reference electrode 2 via driving springs 4. The inner mass 8 is connected to the outer mass 5 via sensing springs 6. Therefore, the outer mass 5 may be vibrated in the x directions, and the inner mass 8 may be vibrated in the y directions. The outer mass 5, the inner mass 8, driving springs 4, and sensing springs 6 are released and separated from the bottom surface of the micro-gyroscope by certain predetermined distance. Thus, the sacrificial gap is formed between the movable structures and the bottom of the micro-gyroscope.

The driving electrodes 1, 1', the driving sensing electrodes 11, 11', the sensing electrodes 10, 10', the outer mass 5, and the inner mass 8 have comb structures.

If sinusoidal voltage is applied to the driving electrodes 1, 1', the outer mass 5 and the inner mass 8 are vibrated in the x direction(i.e., driving direction in FIG. 7). Differential sinusoidal voltage with 180 degree out of phase is preferably applied to the driving electrodes 1, 1'. Since the comb structures of the driving electrodes 1, 1', and the comb structures 3, 3'(driving combs) of the outer mass 5 are interdigitated, the outer mass 5 and the inner mass 8 may be vibrated due to the driving voltage applied to the driving electrodes 1, 1'. The driving mode resonant frequency may be controlled by adjusting the stiffness of the driving springs 4.

Since another comb structures 7, 7'(driving sensing combs) of the outer mass 5 are interdigitated with the driving sensing electrodes 11, 11', the driving sensing electrodes 11, 11' may detect the vibration of the outer mass 5. If the outer mass 5 is vibrated, the capacitance between the driving sensing electrodes 11 and the driving sensing combs 7, and the capacitance between the driving sensing electrodes 11' and the driving sensing combs 7' are changed. Thus, an external capacitance-to-voltage converter may detect this change, and the vibration of the outer mass 5 may be detected.

If an angular rate is applied to the micro-gyroscope in the z direction, the inner mass 8 receives Coriolis force in the y direction which is perpendicular to both the driving direction(x direction) of the inner mass and the direction of the applied angular rate(z direction). Therefore, the inner mass 8 is vibrated in the y direction(sensing direction in FIG. 7).

Since the comb structures 9, 9'(sensing combs) of the inner mass 8 and the sensing electrodes 10, 10' are interdigitated with each other and form capacitance, the sensing electrodes 10, 10' may detect the vibration of the inner mass 8. If the inner mass 8 is vibrated in the y-direction, the capacitance between the sensing electrodes 10, 10' and the sensing combs 9, 9' are changed, which is detectable by the electrodes 10, 10'. The sensing mode resonant frequency may be controlled by adjusting the stiffness of the sensing springs.

Thus, the micro-gyroscope may detect and measure the applied angular rate by means of sensing electrodes 10, 10' which may sense the vibration of the inner mass 5.

The reference electrode 2, the driving electrodes 1, 1', the driving sensing electrodes 11, 11', and the sensing electrodes 10, 10' should be electrically isolated from each other. The outer mass 5, which is a movable structure, is connected to the reference electrode 2 via the driving springs 4, and the inner mass 8 is connected to the outer mass 5 via the sensing springs 6. Therefore, the reference electrode 2, the driving springs 4, the outer mass 5, the sensing springs 6, and the inner mass 8 have same electric potential.

The driving electrodes 1, 1', the driving sensing electrodes 11, 11', and the sensing electrodes 10, 10' are composed of two opposite electrodes. Thus, differential driving or differential sensing may be accomplished.

The detailed isolation process is shown in FIGS. 8A–8E. In FIGS. 8A–8E, it is assumed that the single-crystalline-silicon microstructure is already fabricated using a suitable process. This embodiment uses the SBM process. For example, using the process disclosed in the Korean Laid-Open Patent Publication No. 1999-79113, the micro structure shown in FIG. 8A may be fabricated by etching mask patterning process, silicon deep etching process, sidewall passivation process, and wet etching process with alkaline solution for release and separation of the structure in order to forming the sacrificial gap.

For the convenience of the explanation, the two fixed structures 80, 81, and the movable structure 82 are depicted simply. The two fixed structures 80, 81 may be the reference electrodes 2, driving electrodes 1, 1', the driving sensing electrodes 11, 11', or the sensing electrodes 10, 10' shown in FIG. 7. The movable structure 82 may be the driving springs 4, the outer mass 5, the inner mass 8, or the sensing spring 6 in FIG. 7, which are located between the fixed structures 80, 81, and released and separated from the bottom surface of the micro-gyroscope by certain predetermined distance. Thus, the sacrificial gap is provided between the movable structure 82 and the bottom of the structure.

Figure 8A:
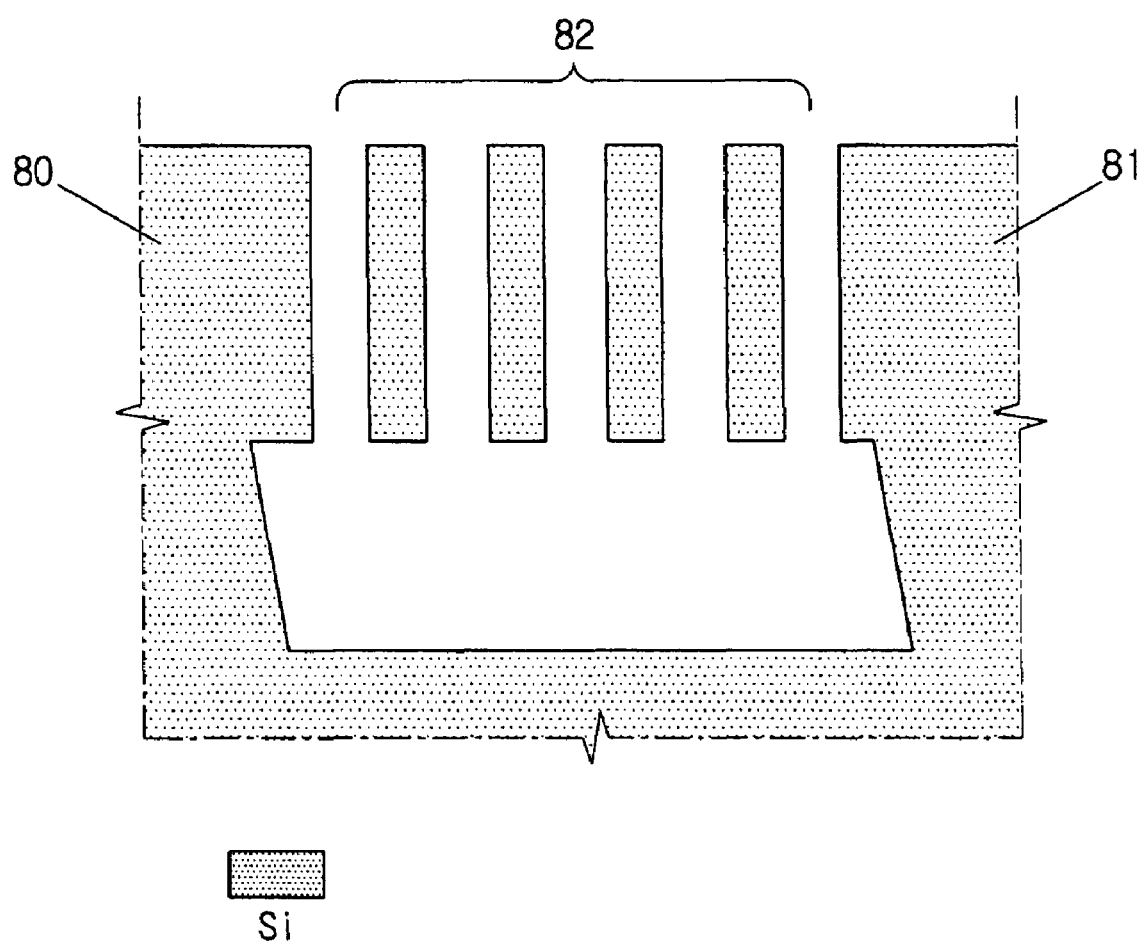
FIGS. 8A–8E illustrate an isolation method used in the embodiment of the present invention.
Figure 8B:
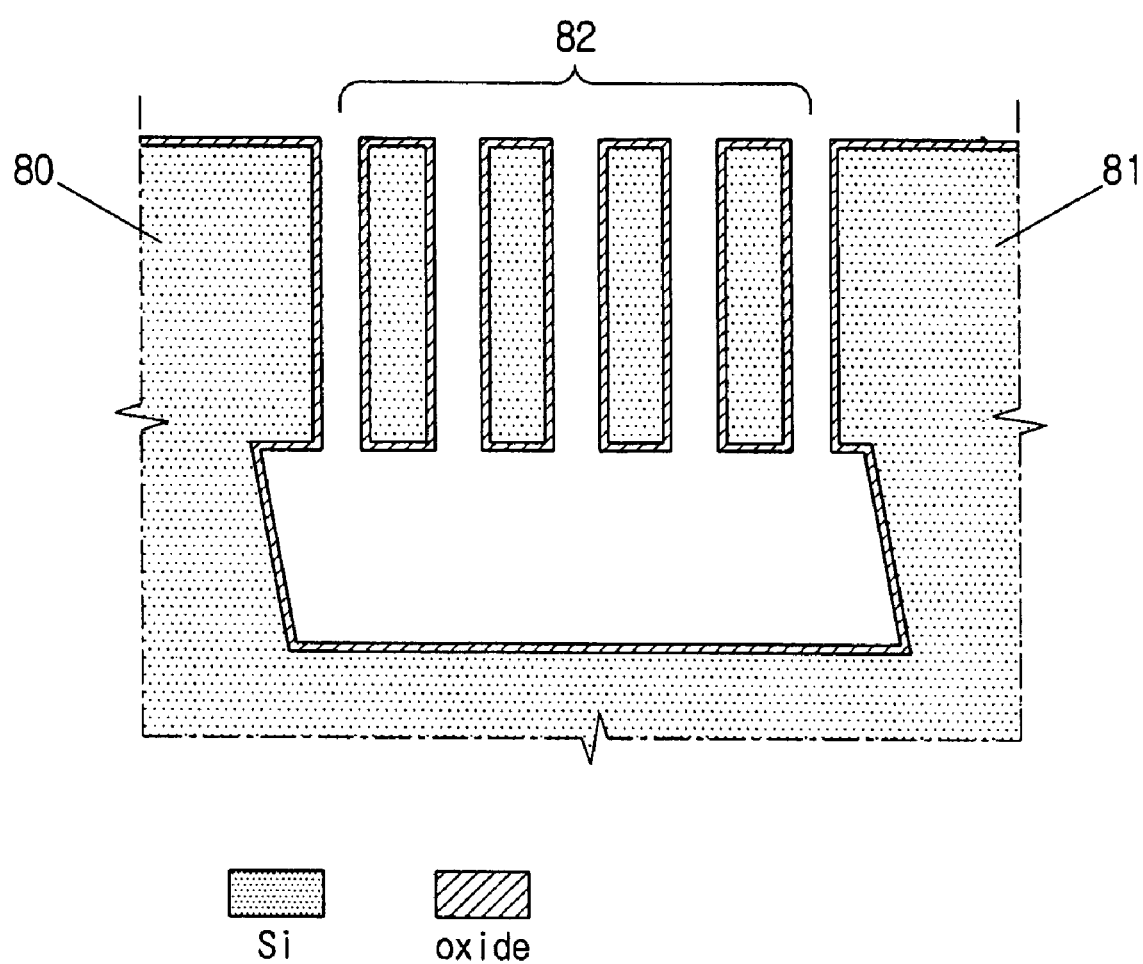
Figure 8C:
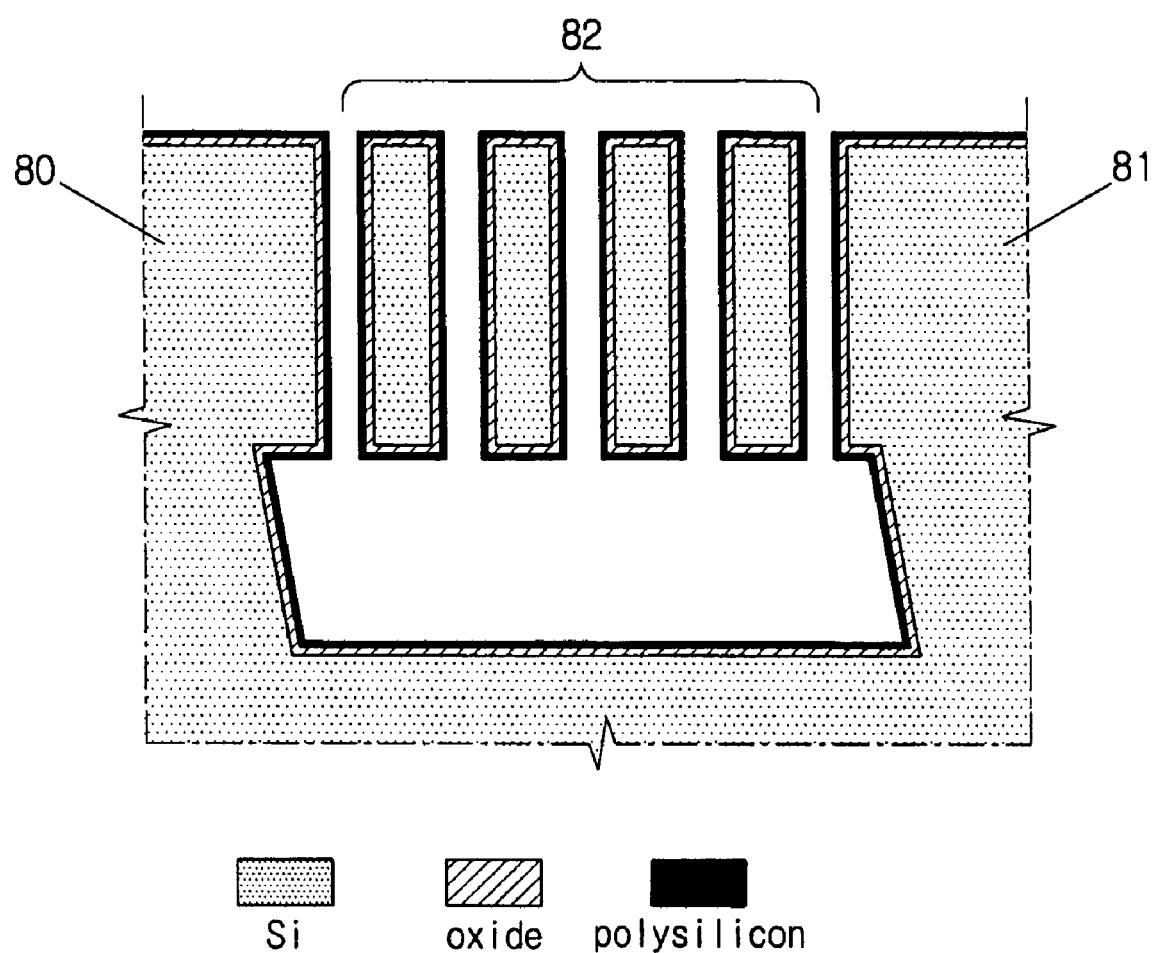

Then, isolation process starts with the oxidation of all exposed surfaces(FIG. 8B), followed by heavily-doped LPCVD polysilicon deposition (FIG. 8C). Since the LPCVD polysilicon films have a good step coverage, the polysilicon films are deposited at all sides of the released microstructure as well as at the top and bottom sides of the sacrificial gap as shown in FIG. 8C. Thus, the polysilicon deposited on the sidewall of the combs may form capacitors between the combs.

Figure 8D:
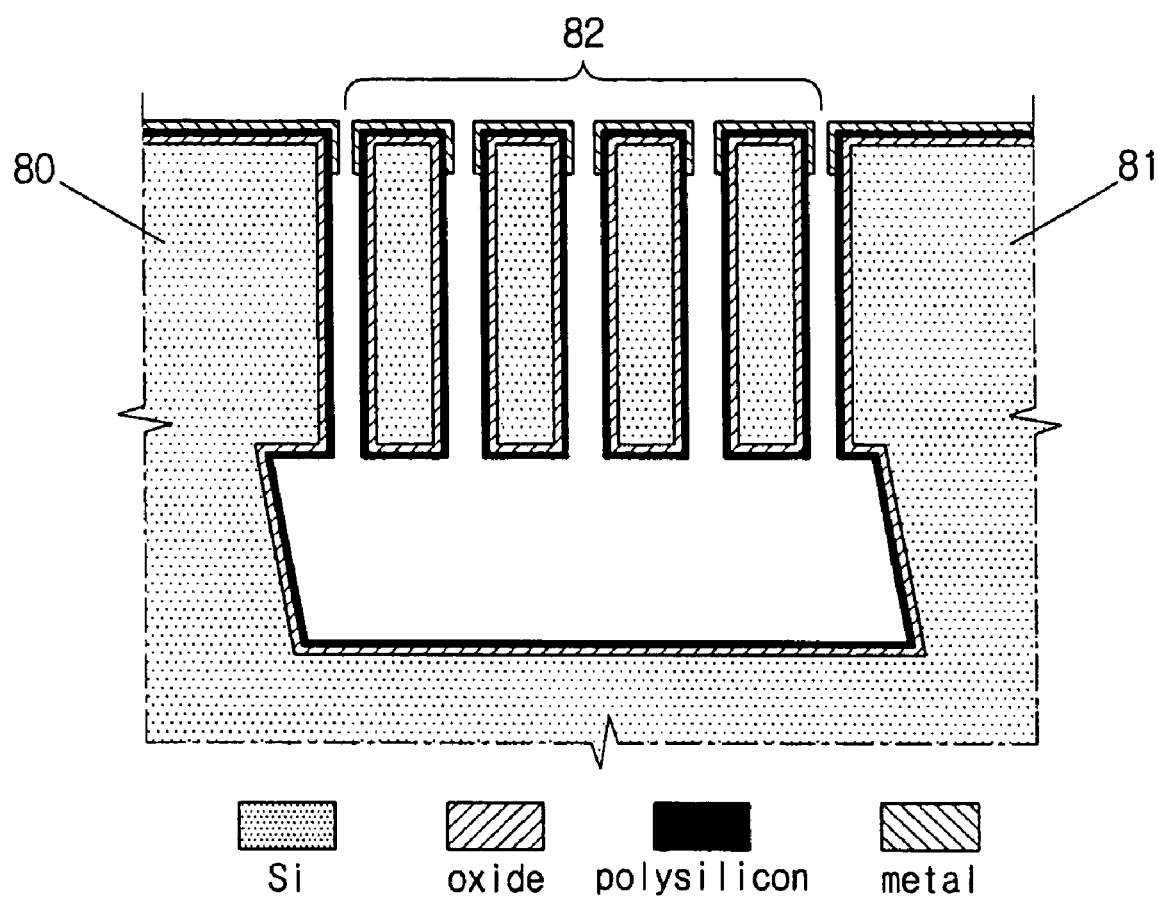

Then, a metal film, such as aluminum film, gold film, or titanium film is sputtered or evaporated(FIG. 8D). This embodiment uses aluminum. For this step, equipment with poor step coverage is desired, since it is desired that the trench bottoms do not get deposited with metal. Thus, isolation between combs are not disturbed by the metal deposition.

Figure 8E:
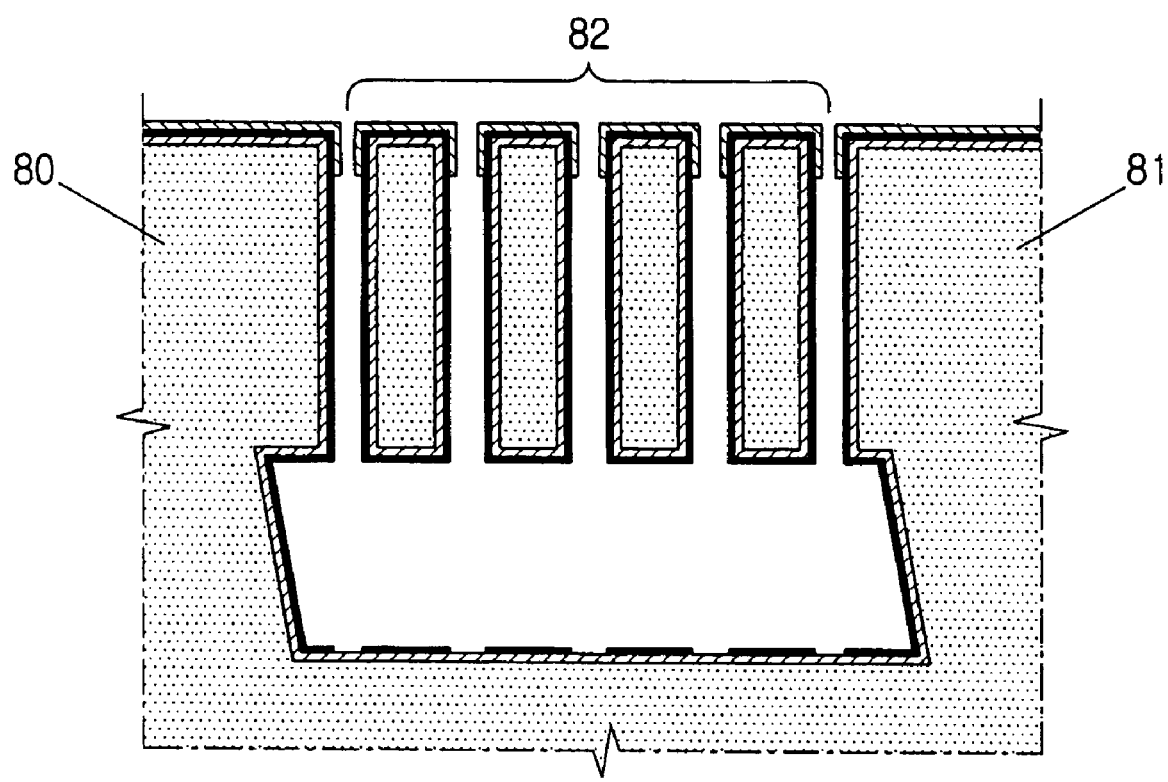
Figure 8E:

Polysilicon films at the exposed bottom areas are then anisotropically etched away, using an $SF_6$ and $C_4F_8$ based RIE process (FIG. 8E). The top Al layer serves as the etch mask, since $SF_6$ and $C_4F_8$ plasmas do not etch Al. Thus, among the polysilicon films deposited on the bottom surface of the micro-gyroscope, only the portion exposed to the top of the micro-gyroscope is etched away. That is to say, in the micro-gyroscope of FIG. 7, the polysilicon on the bottom corresponding to the gap between the structures i.e., the reference electrodes 2, driving electrodes 1, 1', the driving sensing electrodes 11, 11', the sensing electrodes 10, 10', the driving springs 4, the outer mass 5, the inner mass 8, and the sensing electrodes 6 is etched away. Thus, the reference electrodes 2, driving electrodes 1, 1', the driving sensing electrodes 11, 11', and the sensing electrodes 10, 10' are electrically isolated from each other.

Thus, according to the present invention, micro structures are electrically isolated easily although the aspect ratio is high and the gap between the structures is narrow. A separate photolithography process for isolation is not required.

The electrical isolation is obtained in this step. It is also possible to etch the polysilicon at the trench bottom before the deposition of Al. In this case, the Al films contact with polysilicon films only at the upper sidewalls of microstrutures.

Figure 9A:
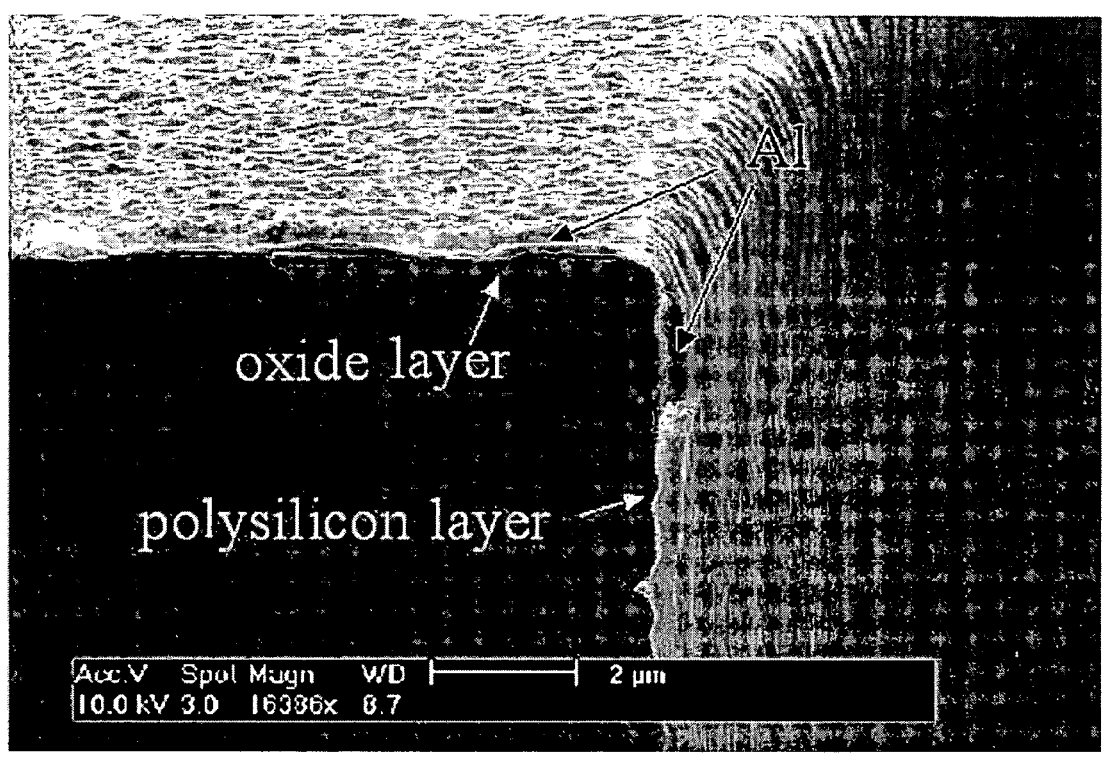
FIGS. 9A–9B are SEM photographs of trench processed by the oxide/polysilicon/metal isolation method.
Figure 9B:
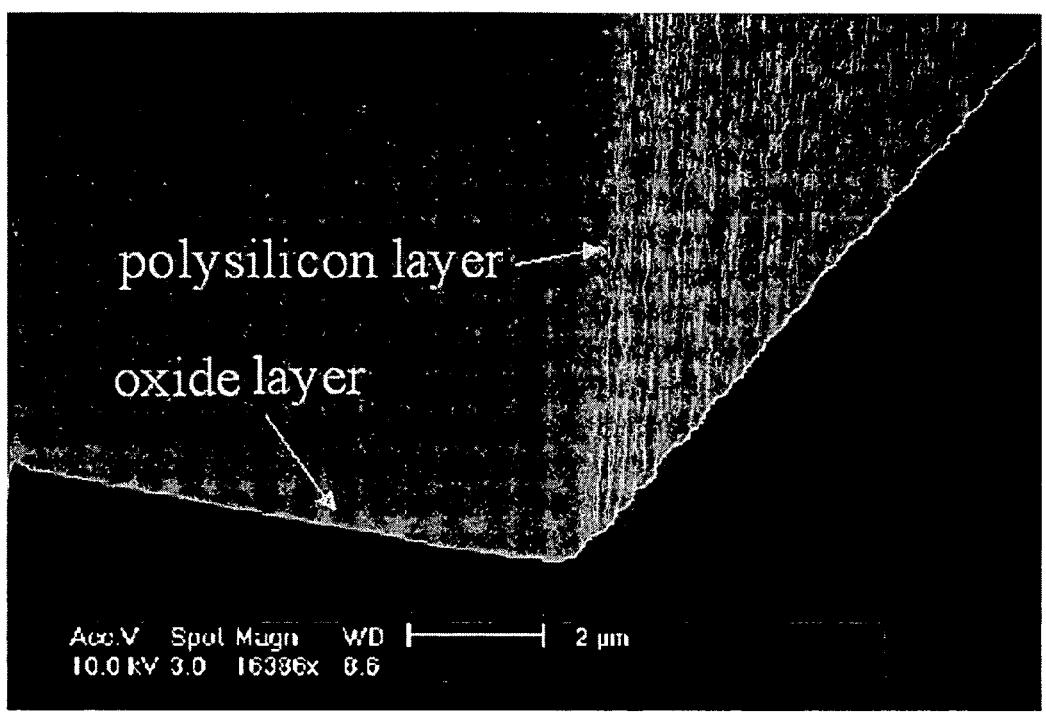

FIG. 9 shows a fabrication example of oxide/polysilicon/metal triple layer isolation, which is a cross section of a gyroscope fabricated in this embodiment. The thicknesses of the oxide, polysilicon, and metal films measured at the top side of wafer are 0.12 micrometer, 0.18 micrometer, and 0.35 micrometer, respectively. The width of the comb is 40 micrometer, and the width of the gap between the combs is 8 micrometer. FIG. 9A shows the upper part of the combs. All the oxide, polysilicon and Al films are clearly visible at the top. On the sidewall, however, Al film is not deposited beyond several micrometer from the top. In FIG. 9B, which shows the lower part of the trench, the oxide and polysilicon films are uniformly deposited on both the sidewall and the bottom surface facing the substrate. No Al film is visible on any of the surfaces in this lower part. This allows utilizing the entire sidewall to maximize capacitance.

In this isolation method, no additional photomask is necessary, and the entire process is very simple and short. Another notable advantage of this method is that gap of combs can be made smaller than the original dimensions defined by photolithography, because of the thickness of the additional films. This can be used to control the electrical capacitance, since it is proportional to the inverse of the gap distance.

The most useful byproduct of this isolation method is that the composite thickness can be adjusted to control and fine tune the device characteristics to match the original design specifications. This is, the undercut phenomenon inherent in deep silicon etchers can significantly alter the spring constant of beams, and the additional oxide and polysilicon films can be used to compensate for the undercut. In addition, the height of the sacrificial gap can be also adjusted.

Figure 10:
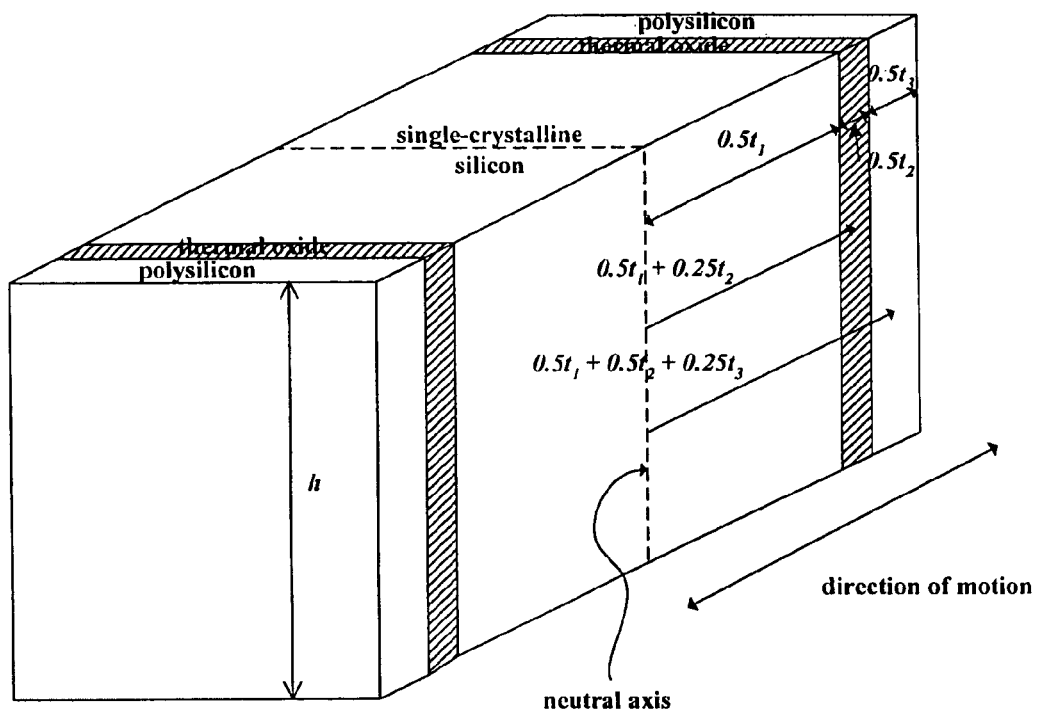
FIG. 10 is a schematic of a spring.

Consider the cross section of a lateral spring shown in FIG. 10. The top metal film is neglected since it does not greatly change the spring constant.

To develop an expression to predict the value of resonant frequency as a function of deposited film thicknesses, it is assumed that the mass of deposited oxide and polysilicon films are negligible compared to the mass of the structural silicon, which is a reasonable assumption. Then, the value of resonant frequency is solely determined by the modified flexural rigidity, $$EI_{total} = E_1 I_1 + E_2 I_2 + E_3 I_3 \quad (1)$$
$$= E_1 \frac{ht_1^3}{12} + E_2 \left( \frac{ht_2^3}{48} + \frac{ht_2(2t_1 + t_2)^2}{16} \right) +$$
$$E_3 \left( \frac{ht_3^3}{48} + \frac{ht_3(2t_1 + 2t_2 + t_3)^2}{16} \right),$$

where $E_1$, $E_2$, and $E_3$ are the Young's modulus of silicon, oxide film, and polysilicon film, respectively, and $I_1$, $I_2$, $I_3$ are the area moment of inertia of silicon, oxide film, and polysilicon film, respectively. The value of $E_1$ is 168.9 GPa. Note that Young's modulus is transversely isotropic on the (111) plane. It should also be noted that Young's modulus is not isotropic on either the (100) or (110) plane. The values of $E_2$ and $E_3$ can be obtained from the literature. From the equation (1), it is clear that a desired flexural rigidity can be obtained by adjusting the oxide thickness $t_2$ and $t_3$, and the polysilicon thickness $t_3$. Note that since there are 2 parameters $t_2$ and $t_3$, the structural rigidity and the electrical capacitance can be independently controlled in certain ranges.

The micro-gyroscope fabricated in this embodiment, estimates the input angular velocity by sensing the displacement of a proof mass, induced by the Coriolis' force. FIG. 7 shows the schematic of the fabricated micro-gyroscope of the embodiment. The outer and inner masses are driven together in the x-direction at the driving mode resonant frequency. When an angular rate is applied in the z-direction, the inner mass moves in the y-direction. Note that there are different masses and different springs for the driving mode and the sensing mode. In a more conventional coupled-mode gyroscope with only one set of springs and one mass for driving and sensing, an induced Coriolis force makes the oscillation motion elliptical. This elliptical motion reduces the mechanical stability and becomes a source of a mechanical noise. The elliptical motion becomes more pronounced as the resonant frequency mismatch of the driving and sensing mode decreases. In this specification, gyroscopes with one set of suspensions are called "coupled" gyroscopes, and gyroscopes with separate sets of suspensions for the driving and sensing mode are called "decoupled" gyroscope. It is well known that the resolution of a coupled gyroscope is relatively lower than that of a decoupled gyroscope, because of the cross-axis coupling.

An example of micro-gyroscope is shown in FIG. 7. The driving and sensing mode resonant frequencies are designed to be 4.58 kHz and 5.76 kHz, respectively. In the composited beam analysis using (1), the undercut of 2500 Angstrom, the oxide thickness of 1200 Angstrom, and the polysilicon thickness of 1800 Angstrom are considered. The resonant frequency of sensing mode is designed to be about 1200 Hz higher than that of driving mode, since the resonant frequency of sensing mode can be easily lowered with electrostatic tuning.

To design the decoupled gyroscope, two sets of springs for sensing and driving are necessary. These springs should be aligned with each other at a 90° angle.

In this embodiment, a single-crystalline-silicon micro-gyroscope is fabricated in a single wafer using the SBM process and the oxide/polysilicon/metal triple layer isolation method. The thickness of movable structures fabricated micro-gyroscope is 40 micrometer, and the sacrificial gap is 50 micrometer. The chip size is 2.2 mm×3 mm. Only a single mask is required to fabricate the micro-gyroscope. The large sacrificial gap of 10 micrometer, preferably 50 micormeter is beneficial in terms of reducing air damping, and thus, increasing the Q-factor.

The fabrication process starts with an n-type, (111)-oriented silicon wafer with a resistivity of 10 mΩ. A plasma-enhanced chemical vapor deposition (PECVD) oxide layer is deposited and patterned. The deposited oxide layer is used as a hard mask for deep silicon etching. Next, a vertical, deep silicon RIE is performed to a depth of 40 micrometer to define the structural patterns. The first oxide layer should be thick enough to withstand the vertical silicon RIE steps for structure patterning and sacrificial-gap definition, as well as the final aqueous alkaline etching for releasing the structures. In the standard Bosch process, the etch depth is highly dependent on the opening width. Thus, it is important to design all opening width to be about the same in order to have a uniform etch depth. In our design, the minimum opening width is 2 micrometer and the maximum is 15 micrometer. The maximum opening width is the required dimension for resonating the structure. The final structure thickness becomes the etch depth at the smaller openings.

After the structure patterning step, a 1200 Angstrom-thick thermal oxide film is grown. The film is used to protect the structure sidewalls in alkaline etching. This oxide film is then anisotropically etched using RIE to expose bare silicon at the bottom of the etched patterns. This step should not etch the oxide on sidewalls and should not expose bare silicon at the top. Then, the silicon wafer is vertically etched again using deep silicon RIE. The etch depth at the larger opening measured from the first etch depth at the smaller opening is 50 micrometer. This results in a sacrificial gap of 50 micrometer. The wafer is then dipped into a 20%, 90° C. tetramethyl ammonium hydroxides (TMAH) solution for 15 minutes, to perform the release etch. In this step, the lower parts of the sidewalls without the oxide passivation will be etched in the lateral direction. The etch rate in <110> directions is about 95 micrometer/hr in this etch condition. After the release etch step, all sidewall passivation oxide and top oxide films are removed in an HF solution.

After that, the oxide/polysilicon/metal triple layer isolation process is performed. For isolation, a 1200 Angstrom-thick thermal oxide film is grown. Next, an LPCVD polysilicon film is deposited to a thickness of 1800 Angstrom. Note that the undercut in our deep etch process is about 2500 Angstrom. The deposition temperature is 585° C., and the as-deposited residual stress is 30 MPa in a tensile state. For doping of polysilicon films, the predeposition of phosphorus-containing oxide is performed at the atmospheric pressure and 900° C. for 10 minutes, with 2000 sccm of $N_2$, 400 sccm of $POCl_3$-containing $N_2$, and 200 sccm of $O_2$. Then, a 3500 Angstrom-thick, 1% silicon-containing Al film is sputtered at the top. This Al film deposited on the top of the micro-gyroscope is used for the electrodes, and also serves as the hard mask for the ensuing polysilicon anisotropic etch to remove the lines and areas of polysilicon at the bottom for electrical isolation.

Figure 11A:
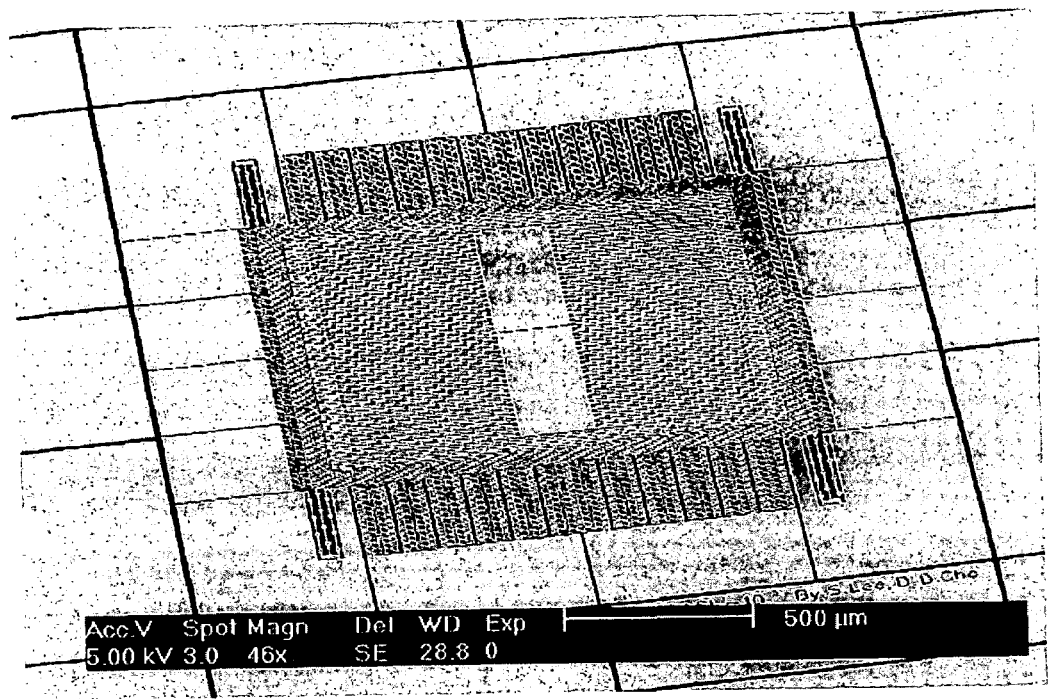
FIGS. 11A–11E are SEM photographs of the fabrication process for the micro-gyroscope using the SBM process.
Figure 11B:
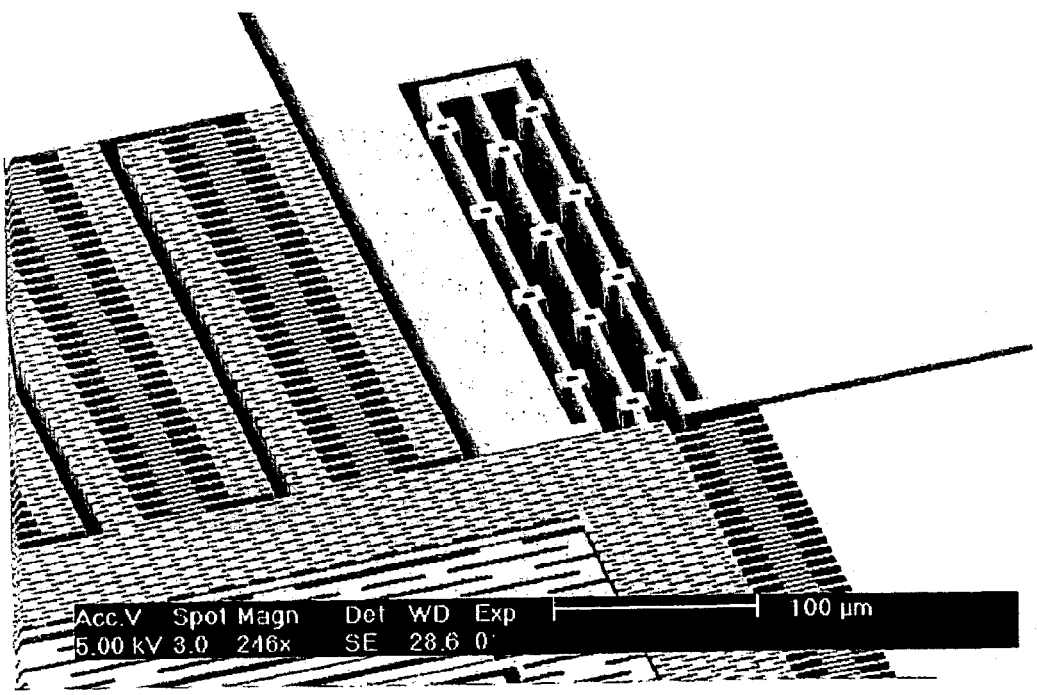
Figure 11C:
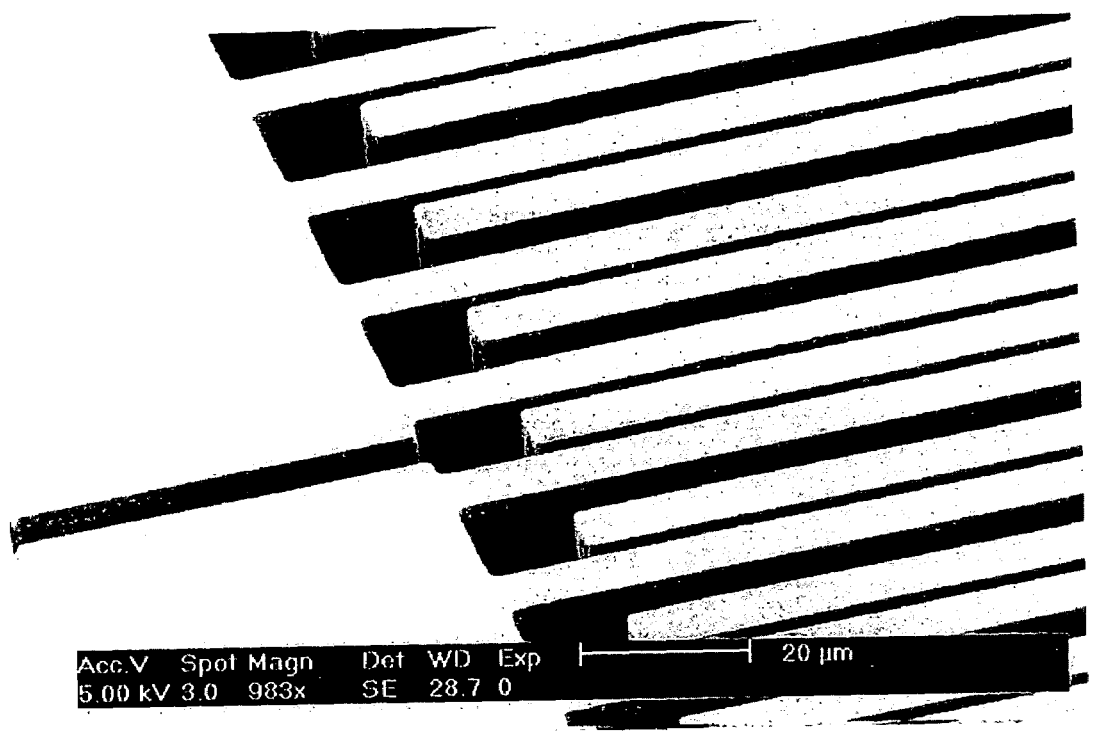
Figure 11D:
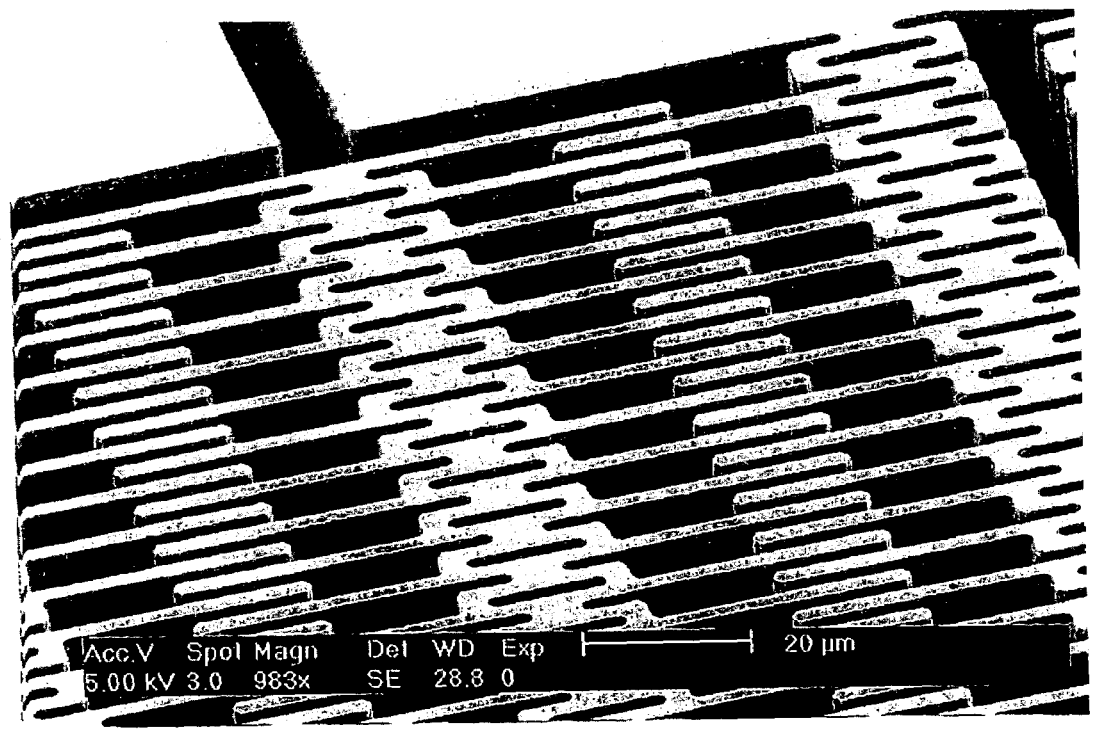
Figure 11E:
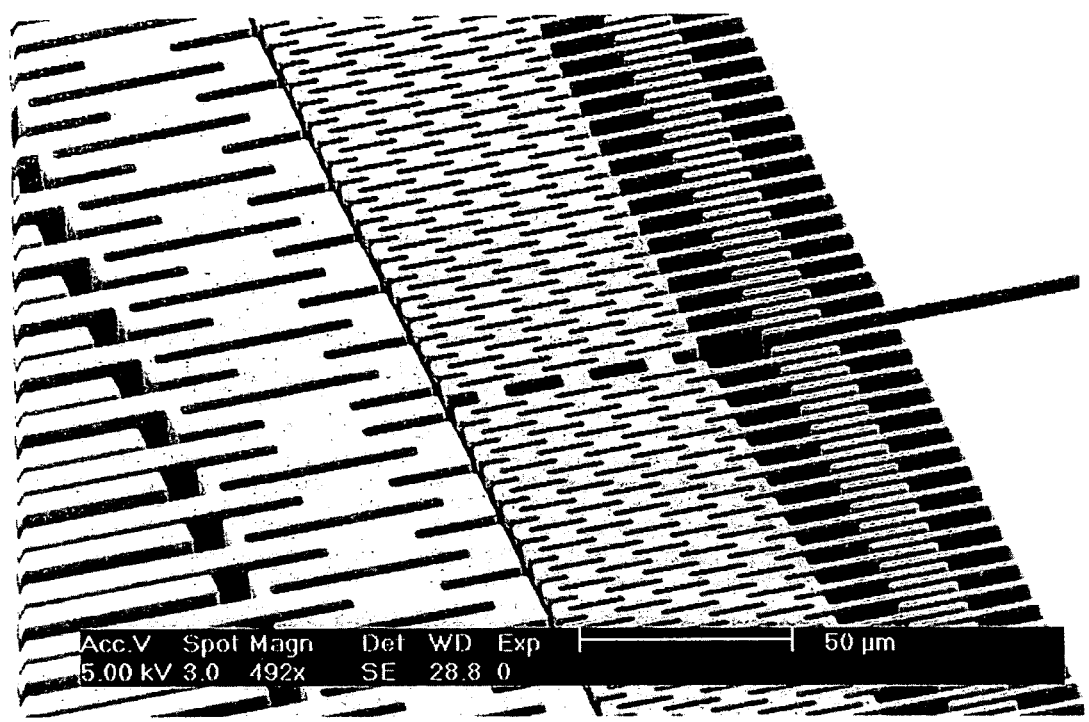
Figure 12:
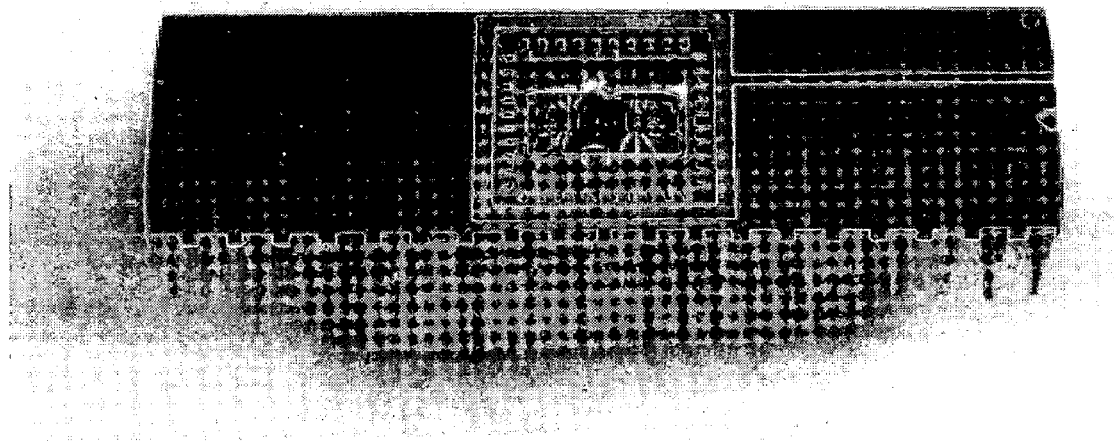
FIG. 12 shows a packaged and wired-bonded micro-gyroscope.

FIG. 11A shows SEM photographs of the released micro-gyroscope. FIG. 11B shows the concatenated springs. FIGS. 11C, 11D, and 11E show the combs for sensing Coriolis' force, the combs to drive the mass, and the combs for sensing the driving motion, respectively. FIG. 12 shows a packaged and wire-bonded micro-gyroscope.

Figure 13:
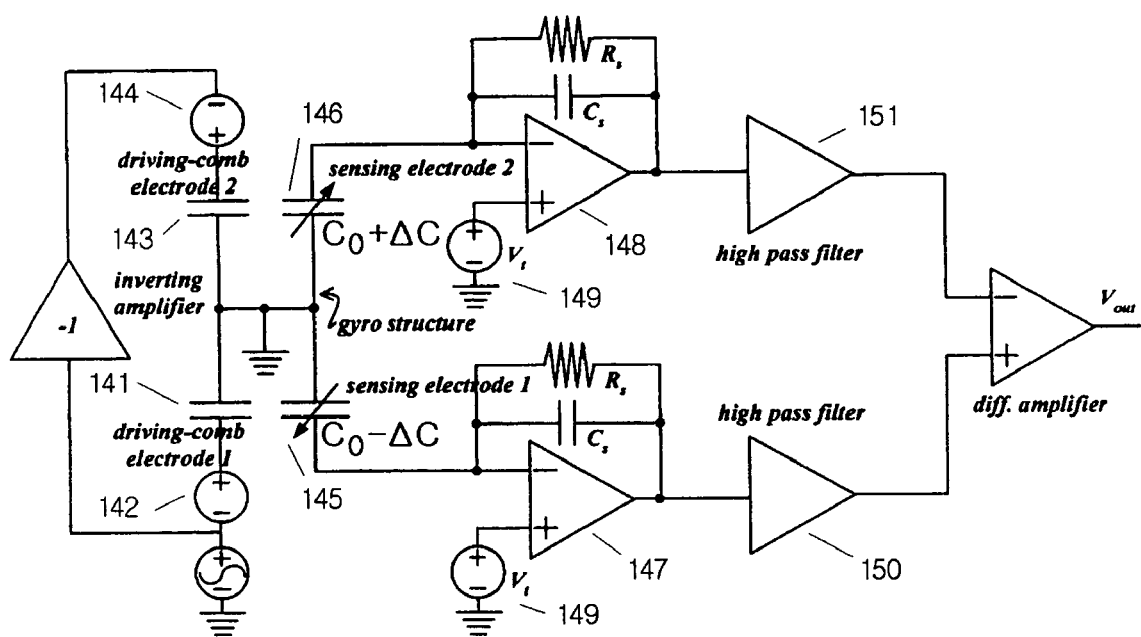
FIG. 13 shows an experimental setup for the performance test of the fabricated micro-gyroscope.

The performance of the fabricated micro-gyroscope is experimentally evaluated. FIG. 13 shows the measurement scheme. In the testing, the feedback control for generating self-oscillation of driving mode is not used. However, the combs for sensing driving mode can monitor the displacement induced by the driving-mode vibration. To vibrate the gyroscope, a 2.5 volt peak-to-peak sinusoidal voltage 142 with a 0.8 volt offset is applied to the driving-comb electrode 1 141. The driving-comb electrode 2 143 is oppositely placed to the driving-comb electrode 1 141. To the driving-comb electrode 2 143, an anti-phase sinusoidal voltage 144 with the same offset is applied.

In the prepered embodiment, the moving parts of the micro-gyroscope are connected to ground. Thus, if the moving parts have a zero resistance, there is no electrical signal in the moving parts. However, in reality, the resistance of the moving parts, measured from one end of spring support to the other end, ranges from several tens of ohms to several hundreds of ohms. Therefore, an electrical signal with the same frequency but a slightly different phase to the driving signal is induced in the moving parts. This induced signal becomes a source of noise. The anti-phase driving scheme cancels out this electrical signal because signal induced by the anti-phased driving signal has an 180° phase difference to each other. Moreover, this scheme cancels out electrical signal induced by the parasitic capacitance between the driving and sensing electrodes.

To sense the displacement induced by Coriolis force, the sensing electrodes 145, 146 are connected to the negative input of the two charge amplifiers 147, 148. The moving parts and the substrate are grounded. The tuning voltage $V_T$ 149 is applied to the positive input terminals of the charge amplifiers 147, 148. This tuning voltage is used to control the resonant frequency of the sensing mode. In this setup, the dc voltage of $V_T$ appears at the output of the charge amplifier. To remove the dc voltage, high-pass filters 150, 151 are used. The modulated output voltage is obtained by subtracting the two output signals of the high pass filters 150, 151. Finally, the angular rate is obtained by demodulating the output signal.

Figure 14A:
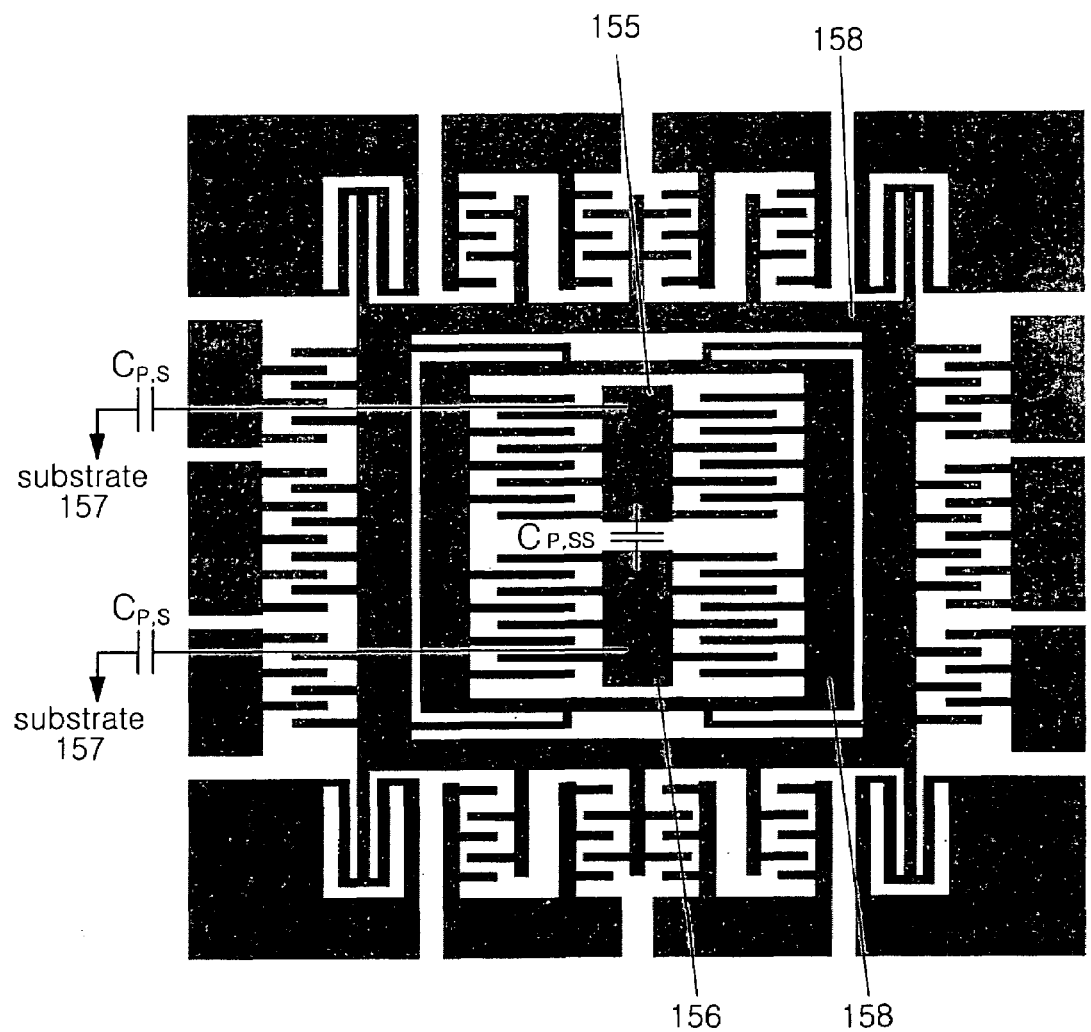
FIGS. 14A–14B show a model for parasitic capacitances.
Figure 14B:
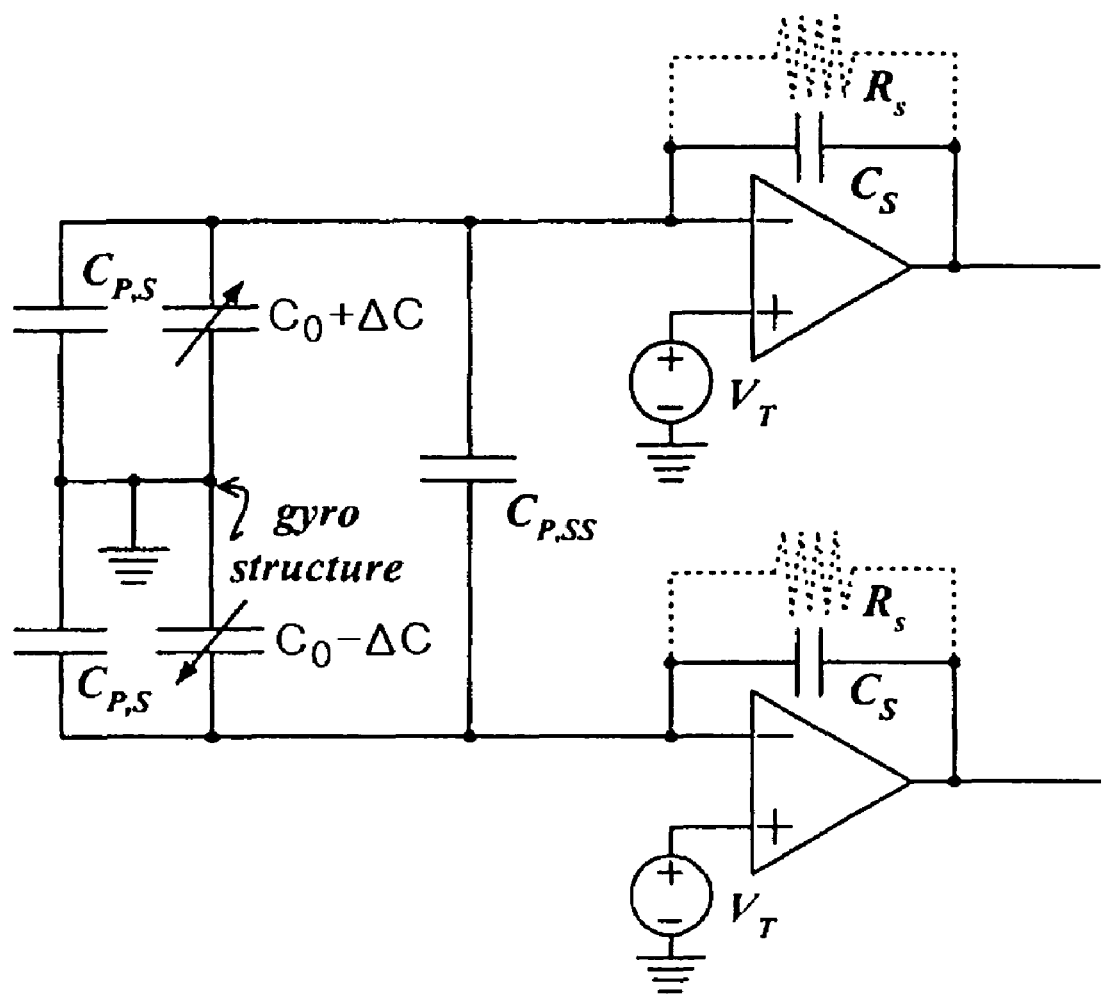

The effect of the parasitic capacitances is analyzed. FIG. 14 shows possible configurations of parasitic capacitance and an equivalent circuit representation. In FIG. 14a, $C_{P,SS}$ is the capacitance between the two sensing electrodes 155, 156. It is calculated to be 14.17 fF for the structural thickness of 40 $\mu$m. The capacitance $C_{P,S}$ between the sensing electrode 155(or 156) and the substrate 157 is calculated to be 41 pF for the insulating oxide thickness of 0.12 micrometer. The capacitance $C_{P,M}$ between the movable structure 158 and the substrate 157 is calculated to be 107.5 pF for the insulating oxide thickness of 0.12 micrometer. The values are calculated using the parallel-plate approximation. In the calculations, it is assumed that the surfaces of substrate facing the sensing electrodes or facing the electrodes connected to the movable structure are in an accumulation state. This assumption is very reasonable because the surface is highly doped with phosphorus and the operation voltage is in the range of several volts. In the equivalent circuit model, $C_{P,M}$ disappears since the substrate and the movable structure are grounded together. The $C_{P,SS}$ also disappears since the two terminals of $C_{P,SS}$ are connected to the negative input terminals of the charge amplifiers, where constant voltage of $V_T$ is maintained by the virtual ground effect. The $C_{P,S}$ can affect the output of the charge amplifiers. However, if the value of $C_{P,S}$ does not change, the effect is none. To keep $C_{P,S}$ constant, a highly doped silicon wafer is used and thus, the surface of the substrate is always in an accumulation state.

To enhance resolution, it is necessary to make the difference in the resonant frequencies of the sensing and driving modes small. Typically, the frequency mismatch should be on the order of 10 Hz. This tight specification requires accurately characterizing the resonant frequencies. The measured resonant frequency of the driving mode is 4.61 kHz, which is slightly higher than the analytic result of 4.58 kHz. The sensing mode resonant frequency can be adjusted by changing the tuning voltage $V_T$. For $V_T$ of 2.5 volts, the resonant frequency is measured to be 5.73 kHz, and for $V_T$ of 5.65 volts, the resonant frequency is measured to be approximately 4.60 kHz, which is separated from the driving mode by approximately 10 Hz. It is estimated that the resonant frequency of the sensing mode with no tuning voltage is approximately 5.80 kHz, which is again only slightly higher than the analytic result of 5.76 kHz.

The fabricated micro-gyroscope is tested in a 10 mTorr vacuum chamber, which is installed on a rate table. The output of the sensing circuit shown in FIG. 13 is connected to a spectrum analyzer. In the test, the sensing mode resonant frequency is tuned to be 11 Hz higher than the driving mode frequency of 4.61 kHz.

Figure 15:
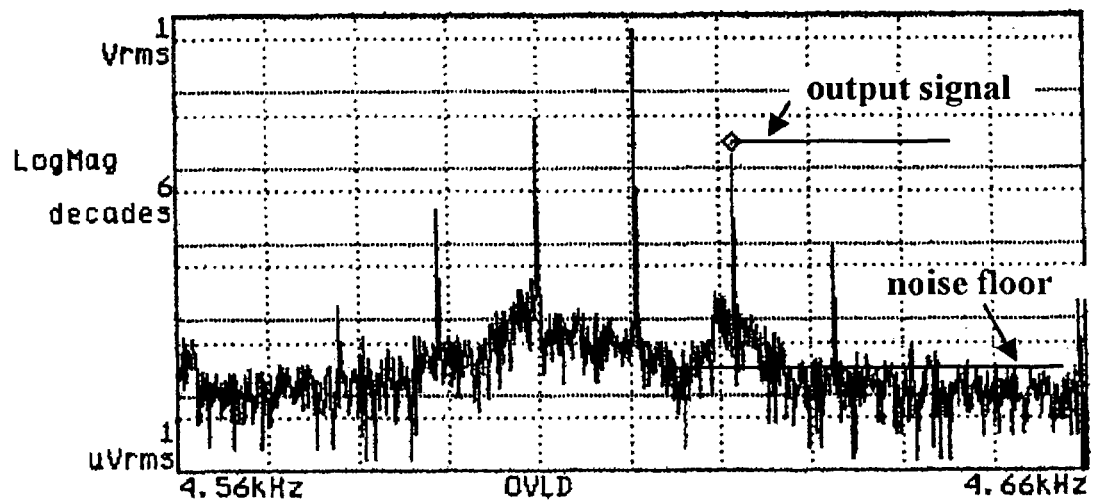
FIG. 15 shows a frequency response of the fabricated micro-gyroscope to 10°/sec, 11 Hz angular rate input.

FIG. 15 shows the output of the spectrum analyzer when a 10°/sec, 11 Hz angular rate is applied to the micro-gyroscope. In FIG. 15, the peak with the largest amplitude is the driving signal at 4.61 kHz, which appears due to the parasitic capacitance between bonding wires. The second largest peak corresponds to the 11 Hz angular-rate input, which is separate from the driving signal by 11 Hz. The third and last peak is separated from the driving signal by 22 Hz. The first peak at 4.61 kHz can easily be eliminated by the synchronous demodulation circuit, since this peak has a phase difference of about 90° with respect to the output signal. The third peak at 4.632 kHz is caused by the pumping line connected to the chamber, where the micro-gyroscope is placed for testing. The pumping line between the chamber and vacuum pump experiences a centrifugal force, which has a frequency twice the rotational frequency of the rate table. This centrifugal force, in turn, imposes a mechanical coupling noise to the chamber. The third peak does not appear if the pumping line is disconnected. In FIG. 15, the amplitude of the second peak at 4.621 kHz is 1,000 times larger than the indicated noise floor, which gives a noise-equivalent angular-rate resolution of 0.01°/sec.

Figure 16:
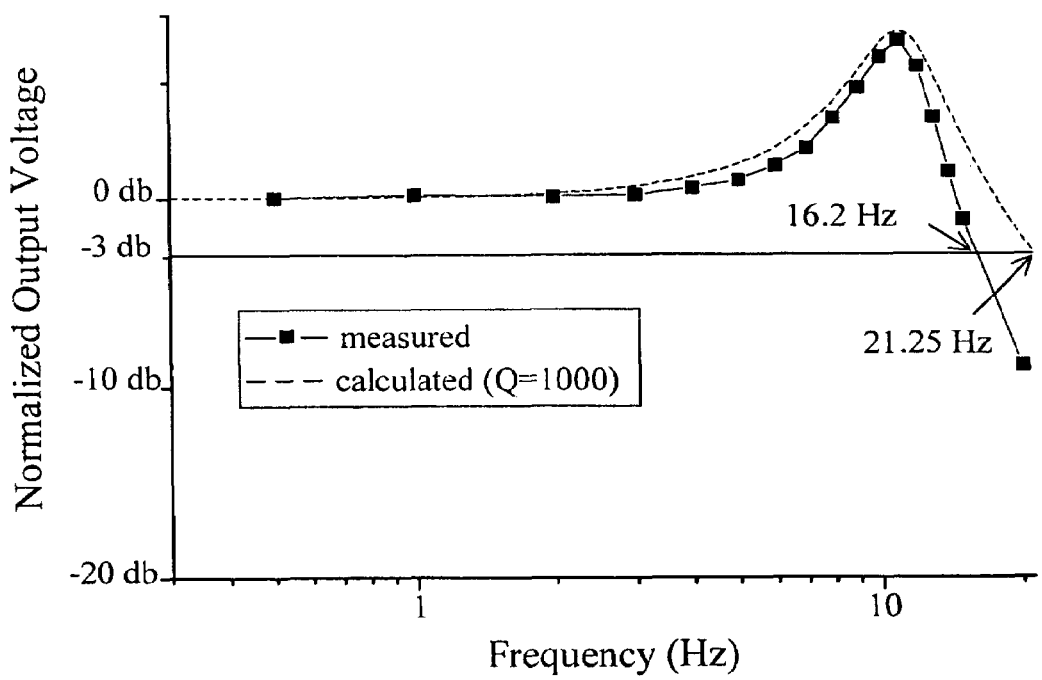
FIG. 16 shows the measured and calculated bandwidth of the fabricated micro-gyroscope.

An important measure of gyroscope performance is bandwidth, which is not uniquely determined by its own parameters. The bandwidth is also dependent on the frequency mismatch and the ambient vacuum level. The frequency response of the fabricated micro-gyroscope is shown in FIG. 16. The measured bandwidth is 16.2 Hz. The calculated frequency response as shown in FIG. 16 is obtained, for $Q_2$ of 1,000.

Figure 17:
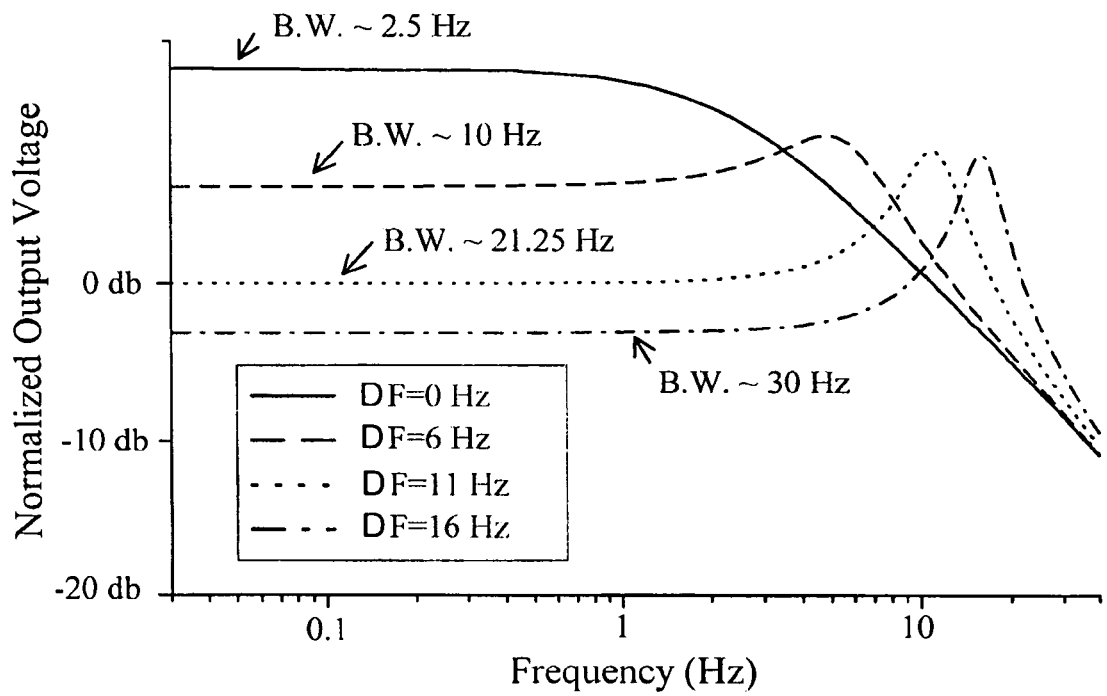
FIG. 17 shows the calculated bandwidth as a function of the frequency mismatch.

The bandwidth is a function of the driving and sensing mode frequency mismatch as shown in FIG. 17. As the frequency mismatch is increased, the bandwidth increases. The trade-off in design is that the resolution becomes poor as this frequency mismatch is increased.

Figure 18:
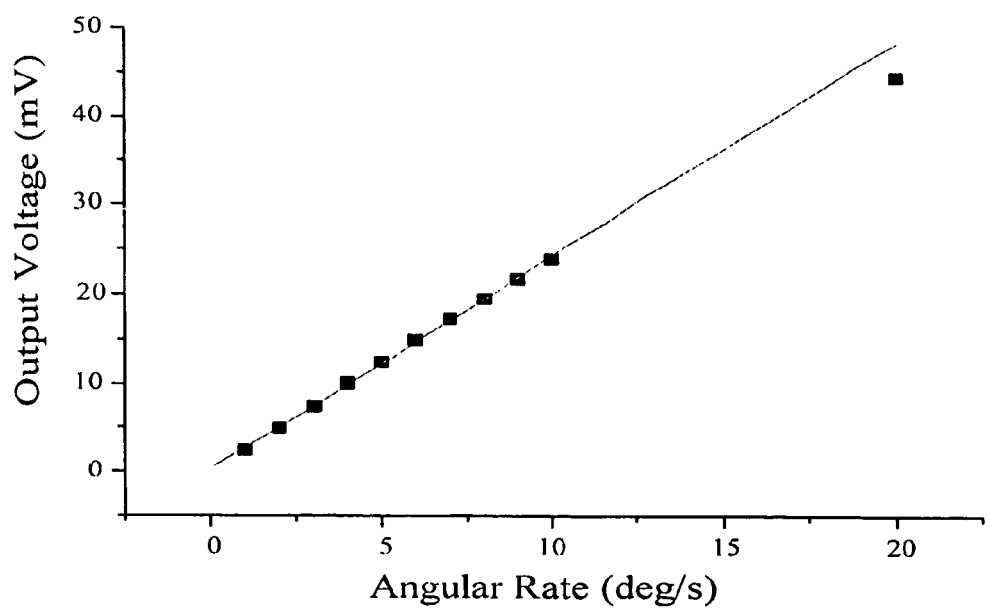
FIG. 18 shows the output versus angular-rate input.

FIG. 18 shows the measured output as a function of angular rate. The frequency of the angular rate is fixed at 11 Hz and the amplitude of the angular rate is varied from 1°/sec to 20°/sec.

What is claimed is:

1. A micromachined single-crystalline silicon micro-gyroscope, comprising:

a reference electrode, driving electrodes, driving sensing electrodes, and sensing electrodes which are fixed structures, and an outer mass which is connected to the reference electrode via driving springs, and an inner mass which is connected to the outer mass via sensing springs, wherein the outer mass and the inner mass are movable structures, and are released and separated from the bottom surface of the micro-gyroscope by a certain predetermined distance, wherein the outer mass and the inner mass are vibrated in the driving direction when voltage is applied to the driving electrodes, and if the angular rate is applied to the micro-gyroscope, the inner mass is vibrated in the direction perpendicular to the driving direction of the outer mass, and the sensing electrodes located in the inner mass detect the vibration of the inner mass, and thus the micro-gyroscope senses the angular rate;

wherein an insulation layer and a conductive layer are deposited on the surface of the micro-gyroscope, a metal layer is further deposited on the top of the micro-gyroscope, and the conductive layer is etched away at the bottom among the reference electrode, driving electrodes, driving sensing electrodes, and sensing electrodes so as to isolate these electrodes from each other.

2. The micro-gyroscope of claim 1, wherein the conductive layer is etched away at a portion of the bottom exposed to the top of the micro-gyroscope as the shape of the movable structure so as to isolate the reference electrode, the driving electrodes, the driving sensing electrodes, the sensing electrodes, and the sensing electrodes from each other.

3. The micro-gyroscope of claim 1, wherein each of the driving electrodes, the driving sensing electrodes, sensing electrodes, the outer mass, and the inner mass have comb structures, the combs of the driving electrodes and some combs of the outer mass are interdigitated with each other so that the outer mass may vibrate due to the voltage applied to the driving electrodes, other combs of the outer mass and the combs of the driving electrodes are interdigitated with each other so that the driving sensing electrodes may detect the vibration of the outer mass, and the combs of the inner mass and the combs of the sensing electrodes are interdigitated with each other so that the sensing electrodes may detect the vibration of the inner mass.

4. The micro-gyroscope of claim 3, wherein the comb structures have high aspect ratio.

5. The micro-gyroscope of claim 1, wherein the conductive layer is composed of polysilicon.

6. The micro-gyroscope of claim 1, wherein the insulation layer is composed of silicon oxide.

7. The micro-gyroscope of claim 1, wherein the driving spring and the sensing spring are arranged with each other at a 90° angle.

8. The micro-gyroscope of claim 7, wherein the vertical depth of both of the driving spring and the sensing spring is larger than 10 micrometer.

9. The micro-gyroscope of claim 7, wherein the substrate of the micro-gyroscope is made of silicon.

10. The micro-gyroscope of claim 1, wherein the metal layer is composed of aluminum.

11. The micro-gyroscope of claim 1, wherein the height of a sacrificial gap formed between the movable structures and the bottom of the micro-gyroscope is not less than 10 micrometer.

* * * * *